(12) United States Patent
Visscher

(10) Patent No.: US 11,475,030 B2
(45) Date of Patent: Oct. 18, 2022

(54) SYSTEM WITH A UNIQUE AND VERSATILE EVALUATION METHOD

(71) Applicant: Ronald Scott Visscher, Holland, MI (US)

(72) Inventor: Ronald Scott Visscher, Holland, MI (US)

( * ) Notice: Subject to any disclaimer, the term of this patent is extended or adjusted under 35 U.S.C. 154(b) by 0 days.

(21) Appl. No.: 16/349,050

(22) PCT Filed: Nov. 10, 2017

(86) PCT No.: PCT/US2017/061112
§ 371 (c)(1),
(2) Date: May 10, 2019

(87) PCT Pub. No.: WO2018/089800
PCT Pub. Date: May 17, 2018

(65) Prior Publication Data
US 2020/0192906 A1    Jun. 18, 2020

(51) Int. Cl.
*G06F 16/25* (2019.01)
*G06F 16/903* (2019.01)

(52) U.S. Cl.
CPC ............ *G06F 16/25* (2019.01); *G06F 16/903* (2019.01)

(58) Field of Classification Search
CPC ............................... G05F 16/25; G05F 16/903
USPC .................................................. 709/223, 224
See application file for complete search history.

(56) References Cited

U.S. PATENT DOCUMENTS

| | | | |
|---|---|---|---|
| 5,233,513 A | 8/1993 | Doyle |
| 5,406,477 A | 4/1995 | Harhen |
| 5,463,555 A | 10/1995 | Ward et al. |
| 5,664,066 A | 9/1997 | Sun et al. |
| 5,937,189 A | 8/1999 | Branson et al. |
| 6,064,382 A | 5/2000 | Diedrich et al. |
| 6,094,656 A | 7/2000 | De Jong |
| 6,134,559 A | 10/2000 | Brumme et al. |
| 6,134,706 A | 10/2000 | Carey et al. |
| 6,141,660 A | 10/2000 | Bach et al. |
| 6,146,027 A | 11/2000 | Orton et al. |
| 6,167,563 A | 12/2000 | Fontana et al. |
| 6,167,564 A | 12/2000 | Fontana et al. |

(Continued)

OTHER PUBLICATIONS

PCT Written Opinion of the International Searching Authority for International Application No. PCT/US17/61112 dated Mar. 23, 2018.

(Continued)

*Primary Examiner* — Thu Ha T Nguyen
(74) *Attorney, Agent, or Firm* — King & Partners, PLC

(57) ABSTRACT

The system described here includes a unique and versatile evaluation method or process invented by the present author. For the sake of this description we will call any entity capable of performing the process an evaluator. The evaluator is an essential part of the system described here. Sometimes such an evaluator is referred to as a visualizer and the evaluation process is referred to as visualization. This is because the process can be set to enable an evaluator to use available data to synthesize evaluative conclusions that appear to consider a subject, including information about both the subject itself as well as other aspects of this subject's environment to alert evaluator and subject of that which warrants attention.

1 Claim, 9 Drawing Sheets

(56) References Cited

U.S. PATENT DOCUMENTS

| | | | |
|---|---|---|---|
| 6,233,537 B1 | 5/2001 | Gryphon et al. | |
| 6,305,007 B1 | 10/2001 | Mintz | |
| 6,311,144 B1 | 10/2001 | Abu El Ata | |
| 6,345,259 B1 | 2/2002 | Sandoval | |
| 6,434,568 B1 | 8/2002 | Bowman-Amuah | |
| 6,988,109 B2 | 1/2006 | Stanley et al. | |
| 7,110,864 B2 * | 9/2006 | Restrepo | H02H 1/0015 324/536 |
| 7,149,724 B1 | 12/2006 | Flanagan et al. | |
| 7,162,427 B1 | 1/2007 | Myrick et al. | |
| 7,277,919 B1 * | 10/2007 | Donoho | H04L 12/1859 709/224 |
| 7,860,883 B2 | 12/2010 | Hinton et al. | |
| 7,864,999 B2 * | 1/2011 | Chang | G06T 5/10 382/280 |
| 7,938,727 B1 | 5/2011 | Konkle | A63F 13/332 463/42 |
| 7,991,764 B2 | 8/2011 | Rathod | |
| 8,069,071 B2 | 11/2011 | Kall et al. | |
| 8,849,862 B2 | 9/2014 | Visscher | |
| 10,057,227 B1 * | 8/2018 | Hess | H04L 63/0853 |
| 10,579,649 B2 | 3/2020 | Visscher | |
| 10,616,162 B1 * | 4/2020 | Zhao | H04L 51/10 |
| 10,718,632 B1 * | 7/2020 | Platt | H04L 67/125 |
| 10,856,136 B1 * | 12/2020 | Espy | H04W 4/021 |
| 11,018,939 B1 * | 5/2021 | Harris | G06K 7/1413 |
| 11,128,636 B1 * | 9/2021 | Jorasch | G10L 15/22 |
| 2003/0110070 A1 | 6/2003 | De Goeij | |
| 2003/0204515 A1 | 10/2003 | Shadmon et al. | |
| 2004/0143669 A1 | 7/2004 | Zhao et al. | |
| 2005/0066058 A1 | 3/2005 | An et al. | |
| 2005/0108001 A1 * | 5/2005 | Aarskog | G06F 40/253 704/10 |
| 2005/0125201 A1 | 6/2005 | Nakao | |
| 2005/0216555 A1 | 9/2005 | English et al. | |
| 2006/0229856 A1 * | 10/2006 | Burrus | G16H 30/40 703/11 |
| 2007/0153766 A1 * | 7/2007 | Bienn | H04W 76/12 370/352 |
| 2007/0220342 A1 * | 9/2007 | Vieira | G06F 11/3688 714/33 |
| 2007/0280463 A1 * | 12/2007 | Kouchri | H04Q 3/66 379/201.01 |
| 2008/0162157 A1 | 7/2008 | Daniluk | |
| 2009/0006467 A1 * | 1/2009 | Visscher | G06F 16/252 |
| 2009/0248599 A1 * | 10/2009 | Hueter | G06Q 30/0202 706/20 |
| 2011/0041073 A1 | 2/2011 | Hoff et al. | |
| 2013/0215116 A1 * | 8/2013 | Siddique | G06Q 20/204 345/420 |
| 2013/0324114 A1 * | 12/2013 | Raghothaman | H04W 8/005 455/426.1 |
| 2014/0280385 A1 * | 9/2014 | Prouty | G06F 16/282 707/812 |
| 2014/0310013 A1 | 10/2014 | Ram et al. | |
| 2014/0349269 A1 * | 11/2014 | Canoy | G06N 20/00 434/322 |
| 2015/0019591 A1 | 1/2015 | Visscher | |
| 2015/0127712 A1 * | 5/2015 | Fadell | H04L 12/2807 709/202 |
| 2015/0154850 A1 * | 6/2015 | Fadell | G06Q 10/083 340/501 |
| 2015/0363478 A1 * | 12/2015 | Haynes | G06Q 10/06 707/610 |
| 2015/0363481 A1 * | 12/2015 | Haynes | G06Q 10/10 707/748 |
| 2016/0210602 A1 * | 7/2016 | Siddique | G06Q 20/384 |
| 2016/0282156 A1 * | 9/2016 | Ott | H04W 4/02 |
| 2016/0371717 A1 * | 12/2016 | Black | G06Q 30/0233 |
| 2017/0034023 A1 * | 2/2017 | Nickolov | H04L 43/0817 |
| 2018/0070136 A1 * | 3/2018 | McCarthy, III | H04N 21/42201 |
| 2018/0096569 A1 * | 4/2018 | Eaton | G08B 25/14 |
| 2018/0262524 A1 * | 9/2018 | Deshpande | H04L 63/1441 |
| 2018/0359244 A1 * | 12/2018 | Cockerill | H04L 63/0823 |
| 2019/0097907 A1 * | 3/2019 | Nickolov | H04L 41/0869 |
| 2020/0027096 A1 * | 1/2020 | Cooner | H04L 67/12 |
| 2020/0125056 A1 * | 4/2020 | Pognant | H04L 67/306 |
| 2020/0142935 A1 * | 5/2020 | Venkatesan | G06F 16/9538 |
| 2020/0174630 A1 * | 6/2020 | Rosenberg | G06F 3/0482 |
| 2020/0213146 A1 * | 7/2020 | Kodam | G01N 33/0057 |
| 2020/0267045 A1 * | 8/2020 | Defiebre | H04L 67/34 |
| 2021/0120193 A1 * | 4/2021 | Swager | H01L 51/5012 |
| 2021/0157312 A1 * | 5/2021 | Celia | G06K 9/6263 |
| 2021/0385277 A1 * | 12/2021 | Binder | H04L 67/12 |
| 2022/0155120 A1 * | 5/2022 | Ramos | G01F 1/6882 |
| 2022/0163511 A1 * | 5/2022 | Choi | A61B 5/02 |

OTHER PUBLICATIONS

Vasconcelos et al., An Information System Architectural Framework for Enterprise Application Integration, System Sciences, 2004. Proceedings of the 37th Annual Hawaii International Conference on System Sciences, Year: 2004, pp. 1-9.

Office Action for U.S. Appl. No. 14/501,802 dated Oct. 21, 2016.
Office Action for U.S. Appl. No. 14/501,802 dated Jan. 29, 2016.
Office Action for U.S. Appl. No. 14/501,802 dated Aug. 17, 2015.

* cited by examiner

| Programmatic Rules Show how decisions in Position Views Triggered Change Executive Decision in Home Subject's (HS) Home Domains (HD) in Phase 1 & 4 show up interdependent or interacting other's Guest Domain (GD) Phase 2 & 3, i.e. Every HD works in same uniform way to manage unique context of each HSs (See Figure 2) | Track and Control Interdependency Phase One When Actor decides or chooses an Evaluation (Vis/Act) result, i.e. $2^{nd}$ CID, $\rightarrow 3^{rd}$ CID is modified which updates both Actor HD and $4^{th}$ CID of Guest: Left CID (LCID) Shifts to Indicate New Ontological State & Right Link is Identified (RLID) | Track and Control Interaction Phase Four When Actor decides or chooses an Evaluation (Vis/Act) result, i.e. $2^{nd}$ CID, $\rightarrow 3^{rd}$ CID is modified which updates both Actor HD and $4^{th}$ CID of Guest: Right Side of CID (RCID) Shifts to Indicate New Metrological State & LLID is identified. | | |
|---|---|---|---|---|
| Change Update One In (re)Actors' Home Domain as Home Subject When Home Subject Decides on Vis/Act results in: Position Views A. I. D. & IV. Home Domain of Actor is updated (See $3^{rd}$ CID after '$\rightarrow$ in $HD_1$' in Figure 2). Other Phases, two and three work similarly. | A Position View (PV) 'A. Convert Value' event decision flips LCID 0 to 1 and PV 'I. Discern Values' flips LCID 1 to 0 and each record has interdependent entity LLIDed who as 'process owner', PV A. in PV 'B. and PV I. in PV II., will translate their values to costs and benefits | A Position View (PV) 'D. and PV 'IV. Create Value' event decisions both flip RCID 1 to 0 and each record has an interacting entity RLIDed who as 'process owner' will, PV D. event in PV 'A. Convert Value' actuate costs and PV IV. in PV 'I. Discern Values potentiate benefits | | |
| Change Update Two Guest Domains are Updated by HDs (Re)Actors' Guest Domains (GDs) receive updates, (See $4^{th}$ CID after 'in __ & GD' in Figure 2) These show actions received thru a data based bidirectional interface at each two LID/CID locations (2xR interaction & 2xL for interdependence) where controlled, thus GDs can be used to observe (re)actions (from PV A. I. D. & IV.) in PV B. II. C. & III. | In addition to above: a Position View (PV) 'A. Convert to Value' & PV 'I. Discern Values' event decisions also both flip RCID 0 to 1 and each record has an interdependent entity RLID which is where, as 'process owner', the chosen X, in PV A. in PV 'C. Discerns Values' or potentiates values for benefit reasons, and PV I. in PV 'III. 'Converts to Value' or actuates value in a way at a cost. | In addition to above: a Position View (PV) 'D. Create Value' event decision flips LCID 0 to 1 and PV 'IV. Create Value' flips LCID 1 to 0, while each record has interacting entity LLID which is where, as 'process owner', the chosen X, in PV D. now in PV 'B. Translates Values' to confirm their costs, and PV IV. now in PV 'II. 'Translates Values' to affirm their benefits. | | |

Figure 9

SYSTEM WITH A UNIQUE AND VERSATILE EVALUATION METHOD

CROSS-REFERENCE TO RELATED APPLICATIONS

This application claims the benefit of U.S. application Ser. No. 15/348,283, entitled "SYSTEM WITH A UNIQUE AND VERSATILE EVALUATION METHOD," filed Nov. 10, 2016, and relates to U.S. Provisional Application Ser. No. 62/413,649, entitled "SYSTEM WITH A UNIQUE AND VERSATILE EVALUATION METHOD," filed Oct. 27, 2016, which are hereby incorporated herein by reference in their entirety—including all references and appendices cited therein.

This application further relates to U.S. Provisional Application Ser. No. 62/253,673, filed Nov. 10, 2015, U.S. application Ser. No. 12/008,979, filed Jan. 15, 2008, now U.S. Pat. No. 8,849,862, which is a continuation of U.S. application Ser. No. 11/803,328, filed May 14, 2007, which is a continuation of U.S. application Ser. No. 11/529,757, filed Sep. 28, 2006, which is a continuation of U.S. application Ser. No. 11/333,804, filed Jan. 17, 2006, which is a continuation of U.S. application Ser. No. 11/135,613, filed May 23, 2005, which claims priority to U.S. Application Ser. No. 60/573,726, and U.S. Application Ser. No. 60/573,264, both filed May 21, 2004, all of which are hereby incorporated herein by reference in their entirety, including all references and appendices cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to a system with unique and versatile mechanisms that enable a computerized system to explain, justify, negotiate, coordinate and validate system component interdependence, interaction and development in a versatile way, such many applications, e.g. diverse types of socioeconomic contracting can be coordinated and managed using the techniques. The latter mentioned applications are merely a result of the technical features and functions of the present invention, and should not be construed to be the essence of the invention. Specifically the present invention has programmable operational characteristics (or context-sensitive mechanisms) that improve the performance and general applicability of computing systems. An instance of the invention implemented in one or more computing machines may actually perform, as well as assist humans in accomplishing, a variety evaluation, problem-solving, explanation, prediction, decision-making, negotiation, implementation, coordination and validation processes. Though preferred embodiments are disclosed to explain how the present invention would perform in specific applications in the field, the present invention is technical in nature, improves the general applicability of general purpose computing machines and, therefore, may be adopted in a broad spectrum of unmentioned and even unforeseen embodiments and applications.

2. Background Art

Evaluation methods have been known in the art for several years and are the subject of a plurality of patents and/or publications, including: U.S. Pat. No. 7,162,427 entitled "Structure And Method Of Modeling Integrated Business And Information Technology Frameworks And Architecture In Support Of A Business," which is hereby incorporated herein by reference in its entirety—including all references cited therein.

U.S. Pat. No. 7,162,427 appears to disclose an enterprise architecture for a business that is divided into a business architecture, an information technology architecture, and an enterprise management framework. The business architecture is the main driver for the information technology architecture, but the information technology architecture can also have an impact on the construction of the business architecture. The enterprise management framework allows for the management of the two architectures. A framework tower is built around essential and mandatory components of the enterprise architecture. The framework tower is made up of a plurality of planes representing mandatory components of the enterprise architecture. The components of the framework tower include a strategic plan, a business architecture, an information architecture, an application architecture, a technology infrastructure architecture, and an enterprise information technology management framework. Each component in the framework tower addresses the people, processes, and technology of the enterprise architecture so that strategic information technology planning, enterprise architecture definition, and repeatable and effective information technology enabling solutions can be performed and delivered to the business.

While other enterprise architectures disclosed supra have been known in the art for years, issues associated with systems performing or assisting in evaluation, problem-solving, recommendation (guidance and alerts), decision-making, negotiation, implementation, coordination and validation of purposeful interaction (smart contracting) remain largely problematic, unsolved, overly simplified, and/or primitive in execution. One particular challenge has been the ability to develop (artificially intelligent or smart) systems that perform these duties and are versatile or generally applicable, while still performing adequately in a variety of situations without additional customizing or redevelopment by a software developer. As such, there is a genuine demand for a novel system with unique and versatile methods and mechanisms.

These and other objects of the present invention will become apparent in light of the present specification, claims, structures, formulae, and drawings.

SUMMARY OF THE INVENTION

The present invention relates in general to a system with unique and versatile mechanisms that enable a computerized system to explain, justify, negotiate, coordinate and validate system component interdependence, interaction and development in a versatile way, such many applications, e.g. diverse types of socioeconomic contracting can be coordinated and managed using the techniques. The latter mentioned applications are merely a result of the technical features and functions of the present invention, and should not be construed to be the essence of the invention. Specifically the present invention has programmable operational characteristics (or context-sensitive mechanisms) that improve the performance and general applicability of computing systems. An instance of the invention implemented in one or more computing machines may actually perform, as well as assist humans in accomplishing, a variety evaluation, problem-solving, explanation, prediction, decision-making, negotiation, implementation, coordination and validation processes. Though preferred embodiments are disclosed to explain how the present invention would perform in specific applications in the field, the present invention is technical in nature, improves the general applicability of general purpose computing machines and, therefore, may be adopted in a broad spectrum of unmentioned and even unforeseen embodiments and applications.

An important characteristic of the present invention is that it enables instances of the disclosed system, in whole and in part, including the home domains of human subjects also involved in performing these operations, to be implemented, monitored, aided and guided based on general purpose evaluation and coordination mechanism(s) that are capable of multi-faceted reasoning and explaining, in language understandable by humans, e.g. how and why certain actions were or should be taken. The present invention allows this to happen in real-time according to versatile data-structure(s), logic model(s) and interface mechanism(s) that can adapt to a broad spectrum of contexts and applications, thus, not only providing superior system performance in these operations, but also requiring less customization and reprogramming by software developers, than prior art. The present invention may improve software development processes, as a byproduct, but its essence or central focus, is that of enabling a general purpose computer to operate in such a way that ongoing software development will be less likely to be required.

According to some embodiments, the present disclosure is directed to a system comprising one or more computers that can be configured to perform particular operations or actions by virtue of having software, firmware, hardware, or a combination of these, implemented in the system such that, in operation, cause the system to perform evaluative, problem-solving, decision-making, negotiation, transaction, implementation, coordination, validation and other actions.

In a preferred embodiment of the present invention, a system with a unique and versatile evaluation method is disclosed, which is often referred to as visualization, and utilizes formula X, namely:

$$\overline{{}^{r}M_{x^{-}..}} = \frac{1}{A^{-}}\sum_{a^{-}=1}^{A^{-}} \frac{1}{B^{-}}\sum_{b^{-}=1}^{B^{-}} r_{x^{-}a^{-}b^{-}}$$ Formula X $$\left\{\frac{1}{X^{+}}\sum_{x^{+}=1}^{X^{+}}\left[\frac{1}{A^{+}}\sum_{a^{+}=1}^{A^{+}}\left(r_{x^{+}a^{+}b^{-}} * \left(\frac{1}{B^{+}}\sum_{b^{+}=1}^{B^{+}} r_{x^{+}a^{+}b^{+}}\right)\right)\right]\right\}$$

$$\left\{\frac{1}{X^{+}}\sum_{x^{+}=1}^{X^{+}}\left[\frac{1}{B^{+}}\sum_{b^{+}=1}^{B^{+}}\left(r_{x^{+}a^{-}b^{+}} * \left(\frac{1}{A^{+}}\sum_{a^{+}=1}^{A^{+}} r_{x^{+}a^{+}b^{+}}\right)\right)\right]\right\}$$

-continued $$\left\{\frac{1}{A^{+}}\sum_{a^{+}=1}^{A^{+}}\left[\frac{1}{B^{+}}\sum_{b^{+}=1}^{B^{+}}\left(r_{x^{-}a^{+}b^{+}} * \left(\frac{1}{X^{+}}\sum_{x^{+}=1}^{X^{+}} r_{x^{+}a^{+}b^{+}}\right)\right)\right]\right\}.$$

The present invention is further directed to derivatives of formula X that would be known to those having ordinary skill in the art having the present disclosure before them.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 6 of the drawings shows sixth aspect of an embodiment of the present invention, specifically a screenshot of an embodiment of a GUI component called the super button in an open state;

FIG. 7 of the drawings shows a seventh aspect of an embodiment of the present invention, specifically a screenshot of an embodiment of a GUI component called the super button in a more completely open state;

FIG. 9 of the drawings shows a fifth aspect of an embodiment of the present invention, specifically Programmatic Rules for Phases four and three. This go along with the Coevaluation Matrix in FIG. 2 to explain the changes that take place to the 'CID/LID pairs' or data location keys as decisions are made and changes implemented. Other phases, specifically two and three, work in similar, yet complementary, ways.

DETAILED DESCRIPTION OF THE INVENTION

Figure 1:
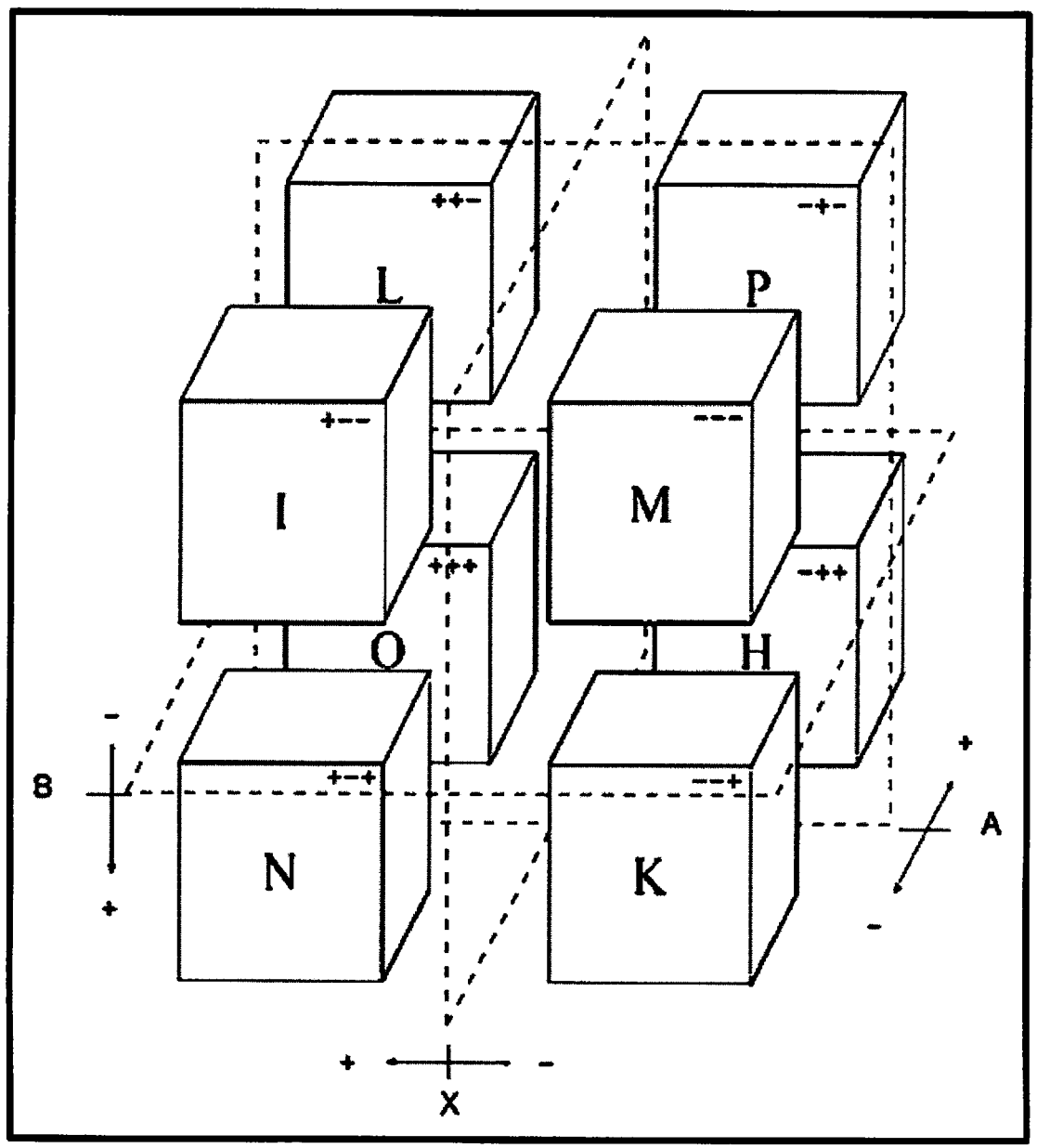
FIG. 1 of the drawings shows a first aspect of an embodiment of the present invention, specifically a canonical model used to depict the data space being processed by the formula X.

The below formulas show how the visualization process proceeds through one set of paths of several possible (See FIG. 1), given one of many possible perspectives taken on by the visualizer. Again, the perspective and interaction mode taken on by the formulas below is represented by the +++ sub cube. There is a meta-model (See U.S. Pat. No. 8,849,862) that depicts and describes the data structure (frameworks), processes (functions), and uses (interfaces) for relationship management (AFFIRM) that are preferred for the efficient and effective running of the visualization process. Yet the specific formulaic instructions for visualization, including the method for determining the directions or paths through which the visualization process should proceed and the type of operations visualization is to execute at each point in the process, has not been specifically disclosed until now. One can also use FIG. 1 to help picture how the visualization process would work and the formulas would be modified for different starting sub cubes perspectives or interaction modes. Keep in mind though that the full perspective does not appear to be known without knowledge of the current W level state, but this will be able to be inferred once the functionality on the three levels in the formulas and depicted in the drawing are understood.

Part or Step I:

Different types of coefficients can be used as raw data for r in the below formulas, such as regression and correlation coefficients, and how these are each used may vary without changing the essential character of visualization. For example, when using correlation among three or more variables, which is done when visualizing three-dimensional sub cubes in the below formulas, there are three variables, an X, an A and a B variable represented by each correlation coefficient. In such a case, it is logical to use multiple correlation. As with normal correlation coefficients, this is a number between −1 and 1 that tells how the variables vary together. When doing multiple correlations with three variables there are two independent variables and one dependent variable. One can use the meta-model or canonical drawing above as a guide do choose the dependent variable that is appropriate, given the direction of the path and desire to minimize loss of needed information. Keep in mind that the capital letters B or X is matrix notation which stands for all the individual b or x variables respectively. Also, b+=1−B+ would be cycling through all b+ variables in the B+ vector using the index values, with B+ being the total number of b+ type individual items or variables. Indeed, B+ would also signify the highest index value in the B+ vector and when to stop looking for more items.

Other notation that may be helpful to know include that the + and − signs signify which side of each dimension of the 3D (sub cube), 2D (sheet) or 1D (line) vector or array being used at a particular time. As mentioned, and as described in U.S. Pat. No. 8,849,862, such symbols (whether they are −/+, 0/1 or whatever symbols one chooses to use) signify the state and location of the data. It will be understood that in a general purpose system with lots of different data spaces labeled in this same way there will also be other information known by the visualizer to find the absolute location for the data needed when in a particular context running a specific instance of visualization. For example, there can be a set of domain chain (DC) location specifiers (See U.S. Pat. No. 8,849,862 for, among other things, AFFIRM disclosure). Also, in the below formulas a dot (.) means an aggregated dimension and a bar over a variable vector's symbol, also signified with a capital letter for the dimension it represents, means that it has been averaged. If only signs are provided such as +++, one can assume that this means X+A+B+, with X then A then B being the standard order used in this standard description of visualization.

I. a)

First, an instance of the visualization process is initiated on or by a computing device to evaluate a particular set of objects for a particular subject. As will be explained in greater detail below, the process may be initiated in a number of ways.

An instance of the visualization process may be initiated in a number of ways, such as by a subject to run on a system or by a system on a subject's behalf. This instance has links to data about a subject that is accessible at a particular location. The data structure can be as abstract as described in the above draft claim or be more specific. For example, once a subject using an AFFIRM-based system has specified a request to visualize, including a particular domain location from which to begin visualization, the visualization process is able to run as specified. In the preferred AFFIRM-based implementation, a user can make direct manual or 'one off' requests or a 'position view' may be specified to automate the initiation and running of a given process.

I. b.)

In the first step, the correlation (or other usable) data representing the subject in the $X^+ A^+ B^+$ sub cube is averaged in the three directions of the three different axes. As is mentioned above, there is significant flexibility in terms of the type of data other than simple correlation data that can be used and also data can be compressed through other types of operations than averaging. Regardless, this step creates three different sheets, each sheet having the one $X^+$, $A^+$ or $B^+$ axis averaged or compressed out that has a different (−) sign in the interim sub cube in which it will be used in Steps II.b.1, II.b.2 and II.b.3 respectively. This compression action is shown for each of the three directions possible for this three-dimensional subject sub cube through the following three formulas:

This action is shown through these formula with each one for one of three different paths:

Path 1:

$$\overline{B^{+++}_{x^+a^+\cdot}} = \frac{1}{B^+}\sum_{b^+=1}^{B^+} r_{x^+a^+b^+}$$

Path 2:

$$\overline{A^{+++}_{x^+\cdot b^+}} = \frac{1}{A^+}\sum_{a^+=1}^{A^+} r_{x^+a^+b^+}$$

Path 3:

$$\overline{X_{a^+b^+}^{+++}} = \frac{1}{X^+} \sum_{x^+=1}^{X^+} r_{x^+a^+b^+} \qquad 5$$

Step II:

In this second step of this version of the standard method each of the values in each of the sheets from the designated subject sub cube are used to multiply with the corresponding values across the corresponding translation sub cube that the given sub sheet faces. As mentioned above, it is possible that other types of operations can be used to enable the values of the subject to weigh in on the process. According to this version of the standard visualization method, the sub cube is then standardized by dividing out the average element value of the $X^+ A^+ B^+$ sub cube representing the subject. In Step II.b.1 below, the example formula is used for the $X^+ A^+ B^-$ interim translation sub cube. This same Step II would also be done using the other two sheets calculated above for their respective or facing $X^+ A^- B^+$ and $X^- A^+ B^+$ interim translation sub cubes as well. After a sub cube is standardized a sheet is calculate in the direction of the object cube (in this case the object sub cube is $X^- A^- B^-$) by averaging or compressing out a dimension as was done in Step I. This sheet is then averaged or compressed into one line corresponding to the axis shared by the object cube. Again, these sub steps are done for the other two translation cubes as well, with all the sub cubes and sheets averaged or compressed in the direction such that the results of this Step II for all three translation cubes converge onto the object cube from a different direction to a different axis, each at the respective axis corresponding to or shared by the given translation sub cube with the object sub cube.

a) The result of this formula or sub step is used later for standardizing out the same amount of value added to the translation cube from the subject cube, when multiplying the sheet throughout the cube. It is just a calculation for the average of the elements within the subject cube. There are other options that may or may not include standardization, and standardization may be done in other ways.

Step 2:

In this step, each particular sheet from above, along with its corresponding translation cube it faces, is used to multiply the sheet across the translation cube. We then standardize the cube by dividing out the average element value of the (+++) cube. This standardization is not always necessary or even preferable in all variations of this visualization method, but doing this standardization enables different parts of this 'standard method' to remain comparable and commensurable even if the parts use data of different types on different scales.

In one example, we will be looking at the (++−) cube as our translation cube, though it works in the same analogous way in the other two translation cubes. After we standardize our cube, we calculate a new sheet in the direction of our object cube (−−−) as we did in step 1. We then average this sheet into one line or single dimension array corresponding to the axis shared between the given translation cube and the object cube.

a) This is one optional way to standardize (or is there a better way when need to 'normalize') out the same amount of value added to the translation cube from the subject cube, when multiplying the sheet throughout the cube. It is just a calculation for the average of the elements within the subject cube.

Usable by all three paths from X+A+B+ subject cube:

$$\overline{E_{...}^{+++}} = \frac{1}{X^+} \sum_{x^+=1}^{X^+} \frac{1}{A^+} \sum_{a^+=1}^{A^+} \frac{1}{B^+} \sum_{b^+=1}^{B^+} r_{x^+a^+b^+} \qquad \text{(II.a)}$$

b) In this sub step, the appropriate sheet from I.b above is multiplied across its corresponding translation cube and the average of the subject cube's elements from II.a above is divided out to get the altered standardized translation sub cube results. The summation and division results in a sheet with one dimension corresponding to the object cube and one of the other axes averaged or compressed. As long as kept track of properly, there are alternative ways the averaging or compressing can go, as long as they are performed in a balanced way. The operations done in Step II.b.1 are repeated for Step II.b.2 and a Step II.b.3 in analogous ways, respectively using the appropriate remaining I.b.2 and I.b.3 sheets along with its corresponding interim translation sub cube. In the drawing in FIG. 1 it can be seen that the corresponding interim sub cube is the one that the sheet is facing. As inferred above, there is a sequence of two axes to be compressed in Steps II.b and II.c, and the order can flip flop, and of course the appropriate respective operations will too, as long as the remaining axis to be compressed (in this case the other dimension with a plus sign) is done in Step II.c below. Of course, as in Step II.b.1 below, the one appropriate sign needs to be flipped from + to − (from the +++ in Step I.b above) to address the correct interim translation sub cube for each of the below formulas.

$$\overline{'A_{x^+\cdot b^-}^{++}} = \frac{1}{A^+} \sum_{a^+=1}^{A^+} (r_{x^+a^+b^-} * \overline{B_{x^+a^+\cdot}^{+++}})/\overline{E^{+++}} \qquad \text{(II.b.1)}$$

b) In this part, we are multiplying the sheet across the translation cube, and then dividing out the average of the subject cube elements, to get the altered standardized translation cube. The summation and division then calculates the sheet corresponding to the object cube by averaging across the one appropriate axis. Alternatively, the second formula does not divide out the average of the subject cube elements, and thus does not standardize. This averages across As in 2b then Xs in 2c, but could do Xs in 2b and then As in 2c. Obviously, this would change the look of the formula.

Path 1:

(2b for L++−) With (one optional method of) standardization. Average or compress A+ below and then X+ in next step 2c to get the B− array to use to translate the object oriented B criterion into that which makes sense or has value for the subject. (May also put 2b Path 2 for L++− here and/or in a separate set of all steps going through L. A is averaged in below step, so then X is averaged in the following step, but, again, it could be X then A. One of these two directional orders or the other may be preferred for convenience or other reasons.

The below formula is a repeat of the above, left here just to check consistency. It can eventually be removed.

$$\overline{'A_{x^+,b^-}^{++-}} = \frac{1}{A^+} \sum_{a^+=1}^{A^+} \left(r_{x^+a^+b^-} * \overline{B_{x^+a^+.}^{+++}}\right)/\overline{E_{...}^{+++}}$$

And without the standardization.

$$\overline{'A_{x^+,b^-}^{++-}} = \frac{1}{A^+} \sum_{a^+=1}^{A^+} \left(r_{x^+a^+b^-} * \overline{B_{x^+a^+.}^{+++}}\right)$$

Since, in this case the subject is the +++ sub cube, due to it being preset (see introduction), and this sub cube (+++), by nature, represents some type of conducer, an entity consuming to produce, the paths shown here are the ones that elucidate the elements of demand that articulate the reasoning of the consumer or end user perspective of +++ on the objects in question. The results are anticipated effects on the subject, if the subject were to integrate and use the object X in it's W (whole). Keep in mind that this W may be a configuration comprised of the home subject W+, as well as parts from multiple other Ws, W–, which in this case would also be contributing roles, perhaps as specified in a job description, that, if using the preferred implementation of AFFIRM, are represented in this subject as X+. This enables a home subject to consider the potential/current/actual (0/X/1) conductive roles it may potentially, is currently or has actually perform/performing/performed for potential/current/actual (0/X/1) guest subjects, e.g., one's potential/current/actual place of employment. Other wholes with representation like this in a home subject's domain are represented there as a W–. In the preferred implementation, this would be expressed in the CID as 1/X/0W–,1/X/0X+, e.g., a potential new role of the home subject, 0X+, at a potential new employer 0W–. So at least these aspects would be represented in an AFFIRM domain as 0W–0X+. The formulas represented here, work with the three dimensions of X, A and B, but if desired could modified to consider the W or fourth level or dimension as well. Notice how by having the two levels W and X a given conducing subject in the visualization formulas, X+A+B+, may be thinking of what it can consume (whether currently consuming the same or not) or do to prepare to be a good employee. It can then compare this 'ideal type' to (or subtract from it) the subject's actual or current in this way, and decide if there is opportunity for improvement (over actual) or real-time adjustment (of current).

The same above context awareness applies to the following two paths, as in the three-dimensional version of visualization there are three paths through which the process, represented by the formulas here in this and subsequent steps must move to do a complete visualization analysis, in this case for this one conducer with roles represented in X+A+B+, considering objects to consume in X–A–B–. Whereas the above Path 1 is moving in the direction necessary to consider the B– or functional dimension of the consumable objects (in Part III), the next path is going to consider A– (in Part III), which is why the A+s from +++ are compressed there instead of the B+s from +++ as above. The next one, Path 3 compresses the X+s from the +++ to prepare for understanding the value of the X–s (in Part III). A possible, but not necessarily recommended, short cut to visualization results that would rank or value the considered objects could be to only go through Path 3 of this Part 2a)3, 2b)3, 3a)3, and the next Part 3. This may be quicker but less precise, not considering A– and B– aspects of the objects. It could be likened to choosing to consume based on brand alone, rather than taking the product features and functions into consideration as well. This is undoubtedly done to some extent by people, so the inclusion of all three paths of the two parts or steps in the computerized visualizer, able to be produce recommendations, decisions or trigger actions in one quick automated process, would be one way such automated visualizers could improve decision-making and effectiveness of people.

Part 2b. Path 2:
With (one optional method of) standardization:

$$\overline{'B_{x^+a^-.}^{+++}} = \frac{1}{B^+} \sum_{b^+=1}^{B^+} \left(r_{x^+a^-b^+} * \overline{A_{x^+,b^+}^{+++}}\right)/\overline{E_{...}^{+++}}$$

Without standardization:

$$\overline{'B_{x^+a^-.}^{+++}} = \frac{1}{B^+} \sum_{b^+=1}^{B^+} \left(r_{x^+a^-b^+} * \overline{A_{x^+,b^+}^{+++}}\right)$$

Part 2b. Path 3:
With (one optional method of) standardization:

$$\overline{'B_{x^-a^+.}^{-++}} = \frac{1}{B^+} \sum_{b^+=1}^{B^+} \left(r_{x^-a^+b^+} * \overline{X_{.a^+b^+}^{+++}}\right)/\overline{E_{...}^{+++}}$$

Without standardization.

$$\overline{'B_{x^-a^+.}^{-++}} = \frac{1}{B^+} \sum_{b^+=1}^{B^+} \left(r_{x^-a^+b^+} * \overline{X_{.a^+b^+}^{+++}}\right)$$

II.c.

c) In this sub step the sheet is then averaged or compressed into a line corresponding to the one axis of the object cube that is shared with this translation cube. Again, the above sub steps are also done in a corresponding way for the other two translation sub cubes, such that these results also converge on the designated object sub cube at the axis they each share with it. The beauty of this step is that at this point all of the data about the subject and its subjective criteria is now translated into the dimensions and criteria of the objects. This is the 'trick' that enables performance on criteria of merit (of objects) to be translated into value (for subjects, given their context, values, criteria, latent variables, mediating variables, moderating variables, constructs, etc.). As a result, this new (deductive, inductive, hybrid, etc.) form of inference, this visualization process and its corresponding actualization process (that goes in the reverse direction) enables construct validity to be estimated and confirmed in a uniquely sound new way. The operations in Step II.c.1 are done in analogous ways for the remaining two parts of Step II.b above.

$$\overline{L_{..b^-}^{++-}} = \frac{1}{X^+} \sum_{x^+=1}^{X^+} {'A_{x^+.b^-}^{++-}} \quad \text{(II.c.1)}$$

c) In this part the sheet is then averaged into a line corresponding to the one axis of the object cube that is shared with this translation cube. One must only take care to average that other of the three dimension that is not the one needed to align with the object cube and that was not already averaged in the above Step 2b. The letters L, N and H could be used in some versions of visualization to designate the data spaces concerned, but in the case of the way the visualization formulas, and the preferred implementations of the programs that run them, these letters are redundant. They are merely used here as another way to signify a particular sub cube, but the identity of the sub cube is already known in the formulas or can be determined by a preferred implementation of the program running the processing of the formulas. Again, once the identity of the subject cube is known for a particular visualization process, the identity or name and, therefore, the location of the rest of the data spaces read and written to at any of the stages in the process can be inferred just by flipping the appropriate sign(s) for X, A and B.

Path 1:

Averaged or compressed A+ above and then X+ here to get the B− array to use to translate the objective oriented B criterion into that which makes sense or has value for the subject.

$$\overline{L_{..b^-}^{++-}} = \frac{1}{X^+} \sum_{x^+=1}^{X^+} {'A_{x^+.b^-}^{++-}}$$

Path 2:

$$\overline{N_{.a^-.}^{+-+}} = \frac{1}{X^+} \sum_{x^+=1}^{X^+} {'B_{x^+.a^-.}^{+-+}}$$

Path 3:

$$\overline{H_{x^-..}^{-++}} = \frac{1}{A^+} \sum_{a^+=1}^{A^+} {'B_{x^-.a^+.}^{-++}}$$

Step 3:

In this step, the corresponding axis lines or arrays of values from each of the three translation sub cubes are multiplied (or weighed in through other means) by the corresponding values in the object cube. The altered object cube is then standardized. After this the visualization results (value, rankings, effect sizes, etc.) are processed by calculating the values for each element of the line or array for each axis or dimension. This is done by getting the sheets of each direction and averaging or compressing them back into the axis line shared with the translation cubes.

a) The result of this calculation is used later for standardizing back out the same amount of value added to the object cube from the translation cube, when multiplying the line throughout the cube. It is just the average or compression of the elements in the altered translation cube. As above, there are other options that may or may not include standardization, and standardization may be done in other ways.

$$\overline{E_{...}^{++-}} = \frac{1}{B^-} \sum_{b^-=1}^{B^-} \overline{L_{..b^-}^{++-}} \quad \text{(III.a.1)}$$

Step 3:

In this step, we take the corresponding axis lines found from each of the three translation cubes and multiply them into the object cube. The altered object cube is then standardized. After this we get the visualization rankings by calculating the ranking lines. This is done by getting the sheets of each direction and averaging them back into the axis line shared with the translation cubes.

a) This is (one optional method) used later for taking out the same amount of value added to the object cube from the translation cube, when multiplying the line throughout the cube. It is just the average of the elements in the altered translation cube. Whether to do some form of standardization will depend on the context, such as whether using data for concepts or instances.

Path 1:

$$\overline{E_{...}^{++-}} = \frac{1}{B^-} \sum_{b^-=1}^{B^-} \overline{L_{..b^-}^{++-}}$$

Path 2:

$$\overline{E_{...}^{+-+}} = \frac{1}{A^-} \sum_{a^-=1}^{A^-} \overline{N_{.a^-.}^{+-+}}$$

Path 3:

$$\overline{E_{...}^{-++}} = \frac{1}{X^-} \sum_{x^-=1}^{X^-} \overline{H_{x^-..}^{-++}}$$

Step 3 or Part III.b.

b) The corresponding values from the axis lines or arrays from the translation cubes are multiplied by the corresponding values in the object cube, and then the element average is divide out for each translation cube to get the altered standardized object cube. (As stated, the below formula should use the correlations (r), or other chosen coefficients if not the standard method, from the object sub cube, which in this case is X− A− B− (as can be seen in below formula, change is done), not X+ A+ B+, as was apparently mistakenly called for in the below formula, before it was changed. Also, the below L variables should have bars over them like the above representative formula at the end of step three)

$$'C^{---} = \frac{r_{x^-.a^-.b^-} L_{..b^-}^{++-} L_{.a^-.}^{+-+} L_{x^-..}^{-++}}{E^{++-} E^{-+} E^{-++}} \quad \text{(3b)}$$

We multiply the corresponding axis lines, found from the translation cubes, into the object cube, and then optionally divide out element average of each translation cube to get the altered standardized object cube. As above, there could also be separate steps for each path. That way, if a short cut was being taken, e.g. not all paths are being used, the multiplication for only those paths that are used or have data need be done. Also, since multiplying, if data for a particular path is missing then the more inclusive calculation would assume 1 (unity) for that part in both the numerator and denominator. In this way it is possible to make formulas with higher level of dimensionality number of paths to be the general case and still apply to situations where there is missing data, paths or even dimensions. This relates with why visualization could be done in more or less dimensions and still maintain its distinctive and essential character.

Using one of the optional standardization methods (using others would not change distinctive nature of the visualization process):

$$'M_{\overline{x^-a^-b^-}} = \frac{r_{x^-a^-b^-} \overline{L_{..b^-}^{++-} N_{.a^-.}^{+-+} H_{x^-..}^{-++}}}{E_{...}^{++} E_{...}^{+-+} E_{...}^{-++}}$$

Without using one of the optional standardization methods for this step:

$$'M_{\overline{x^-a^-b^-}} = r_{x^-a^-b^-} \overline{L_{..b^-}^{++} N_{.a^-.}^{+-+} H_{x^-..}^{-++}}$$

c) The altered standardized object cube is then averaged or compressed back into axis lines for each axis to get the visualization results (values, ratings, etc.) of each object or property for each dimension. There are several different ways the results can be displayed and used. For example, the objects (products, etc.) on the X axis can then be ranked based on their relative value in the X dimension.

We then average back into axis lines for each axis from the altered standardized object cube to get the visualization rankings of each element in each dimension.

The following array of values is used to rank X-s or products in M in order of their 'fit' or 'complementarity' with the subject specified in X+A+B+:

$$'\overline{M_{x^-..}} = \frac{1}{A^-}\sum_{a^-=1}^{A^-} \frac{1}{B^-}\sum_{b^-=1}^{B^-} r_{x^-a^-b^-}$$

The following is used to rank A-s or features in M in order of their importance in determining 'fit' or 'complementarity' of Xs with the subject specified in X+A+B+:

$$'\overline{M_{.a^-.}} = \frac{1}{X^-}\sum_{x^-=1}^{X^-} \frac{1}{B^-}\sum_{b^-=1}^{B^-} r_{x^-a^-b^-}$$

The following is used to rank B-s or functions in M in order of their importance in determining 'fit' or 'complementarity' of X-s with the subject specified in X+A+B+:

$$'\overline{M_{..b^-}} = \frac{1}{X^-}\sum_{x^-=1}^{X^-} \frac{1}{A^-}\sum_{a^-=1}^{A^-} r_{x^-a^-b^-}$$

The above feature and function rankings can be used to custom fit a better solution or product for the subject specified in X+A+B+. It is proposed that together this information may constitute a significant boost to creativity or the design of a more ideal solution for the subject specified in X+A+B+.

The Visualization Formula (with all three of the above parts or steps in one):

Of course, all the above steps can be merged together in Formula X as provided below:

Formula X $$'\overline{M_{x^-..}} = \frac{1}{A^-}\sum_{a^-=1}^{A^-} \frac{1}{B^-}\sum_{b^-=1}^{B^-} r_{x^-a^-b^-} * \left\{ \frac{1}{X^+}\sum_{x^+=1}^{X^+} \left[ \frac{1}{A^+}\sum_{a^+=1}^{A^+} \left( r_{x^+a^+b^-} * \left( \frac{1}{B^+}\sum_{b^+=1}^{B^+} r_{x^+a^+b^+} \right) \right) \right] \right\}$$

$$\left\{ \frac{1}{X^+}\sum_{x^+=1}^{X^+} \left[ \frac{1}{B^+}\sum_{b^+=1}^{B^+} \left( r_{x^+a^-b^+} * \left( \frac{1}{A^+}\sum_{a^+=1}^{A^+} r_{x^+a^+b^+} \right) \right) \right] \right\}$$

$$\left\{ \frac{1}{A^+}\sum_{a^+=1}^{A^+} \left[ \frac{1}{B^+}\sum_{b^+=1}^{B^+} \left( r_{x^-a^+b^+} * \left( \frac{1}{X^+}\sum_{x^+=1}^{X^+} r_{x^+a^+b^+} \right) \right) \right] \right\}$$

Again, using just the one of the three paths that is necessary for using subjective data to ranking the objects in the desired dimension, e.g., the value of X products can be used to simplify an AFFIRM visualization analysis. It would still be the proprietary method described here, because it uses the X−A+B+ interim translation data to go through the process formalized in the last of the three major components (in the third set of braces).

Summary of Visualization Method

Visualization is a formulaic method (implemented in at least one of a system, computing device, article of manufacture or other processor) (using data about a subject and its context, e.g., correlation or other data about the relationship between subject oriented-factors, such as a subject's roles or aspirations, and object-oriented factors, such as an objects features or functions) of assessing value or relevance of object(s) to a subject, comprising the steps of:

preparing information about subject for translation into criteria weights;

(e.g., 'Part 1' summarizing, e.g. sum or average of, multi-dimensional vector, e.g. in 3D (+X+A+B) vector of data about subject, into one or more lower dimensional vector(s), comprising only those dimensions that are shared in common with the data spaces along each of one or more paths, each with its interim (translation) data space(s) to be used in 'Part 2' in, e.g. 2D+A+B vector for use with 3D (−X+A+B) vector (as seen in Part 1 of method, as embodied in formula X, which, optionally, may use +X factors, such as roles of (given) subject, +A factors, such as means or attributes of subject, +B factors, such as ends of, benefits for or needs of subject)

translating information about subject into criteria weights for object; and (e.g. 'Part II' summarizing product of above 2D vector from subject space and 3D vector in interim space in 'Part II.' to 1D vector, e.g. for at least one of the available paths, e.g. one of 3 paths embodied in Formula Z, e.g. for −X, with −X object(s) (evaluand) meaning/difference, −A weights of features, −B weights of functions, as appropriate for (given) subject.)

using weights to value or rank object(s) in terms of complementarity, relevance or value for subject.

(Part III. use 1D vector(s) from at least one of 3 Paths, e.g. −X, to calculate complementarity of objects, −A importance of features or −B importance of functions to subject.)

Figure 2:
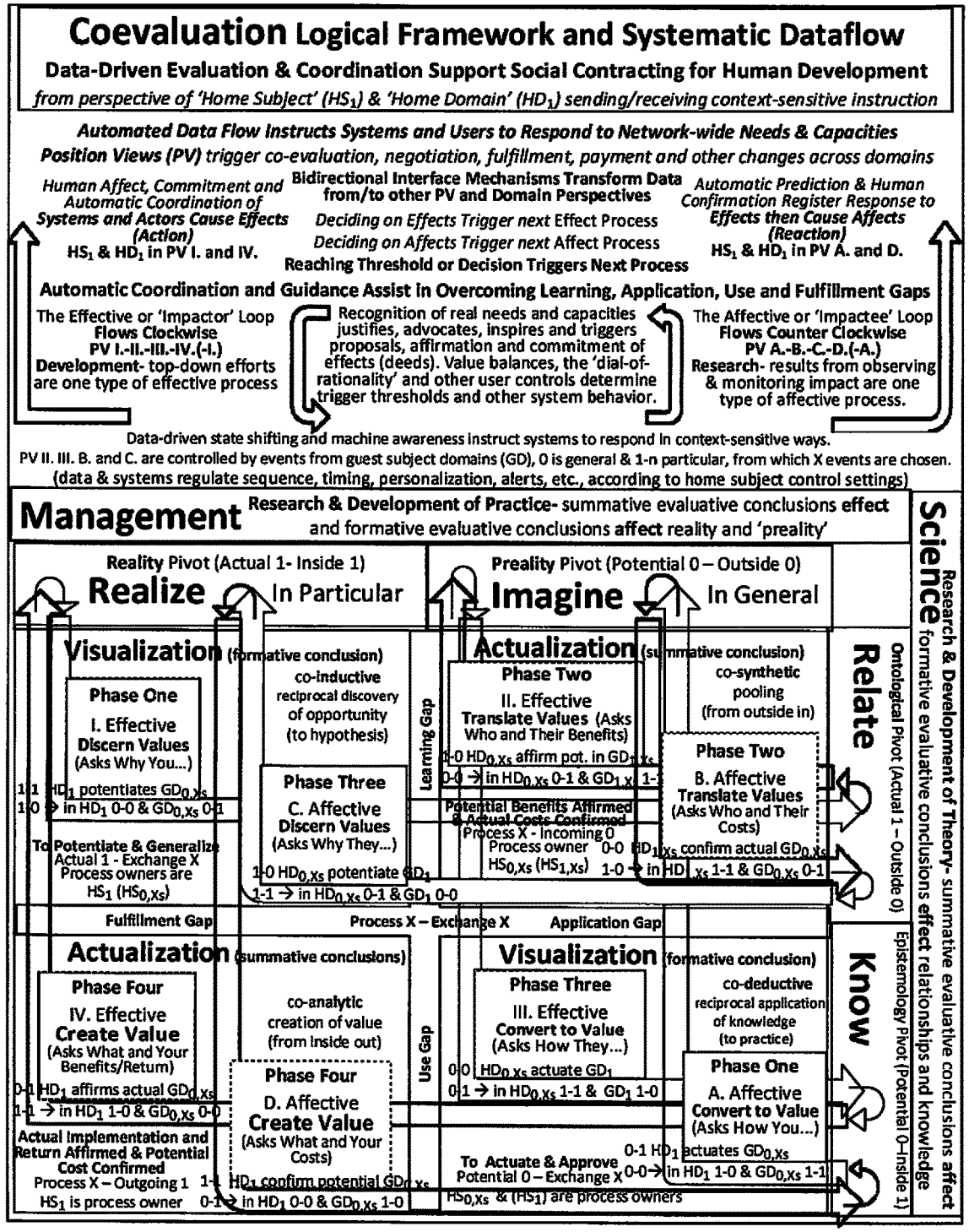
FIG. 2 of the drawings shows a second aspect of an embodiment of the present invention, specifically a 'coevaluation matrix' which shows the various stages, states or perspectives from which a 'Home Subject' may evaluate and how one evaluation's results might flow to or trigger transactions and subsequent evaluations.
Figure 3:
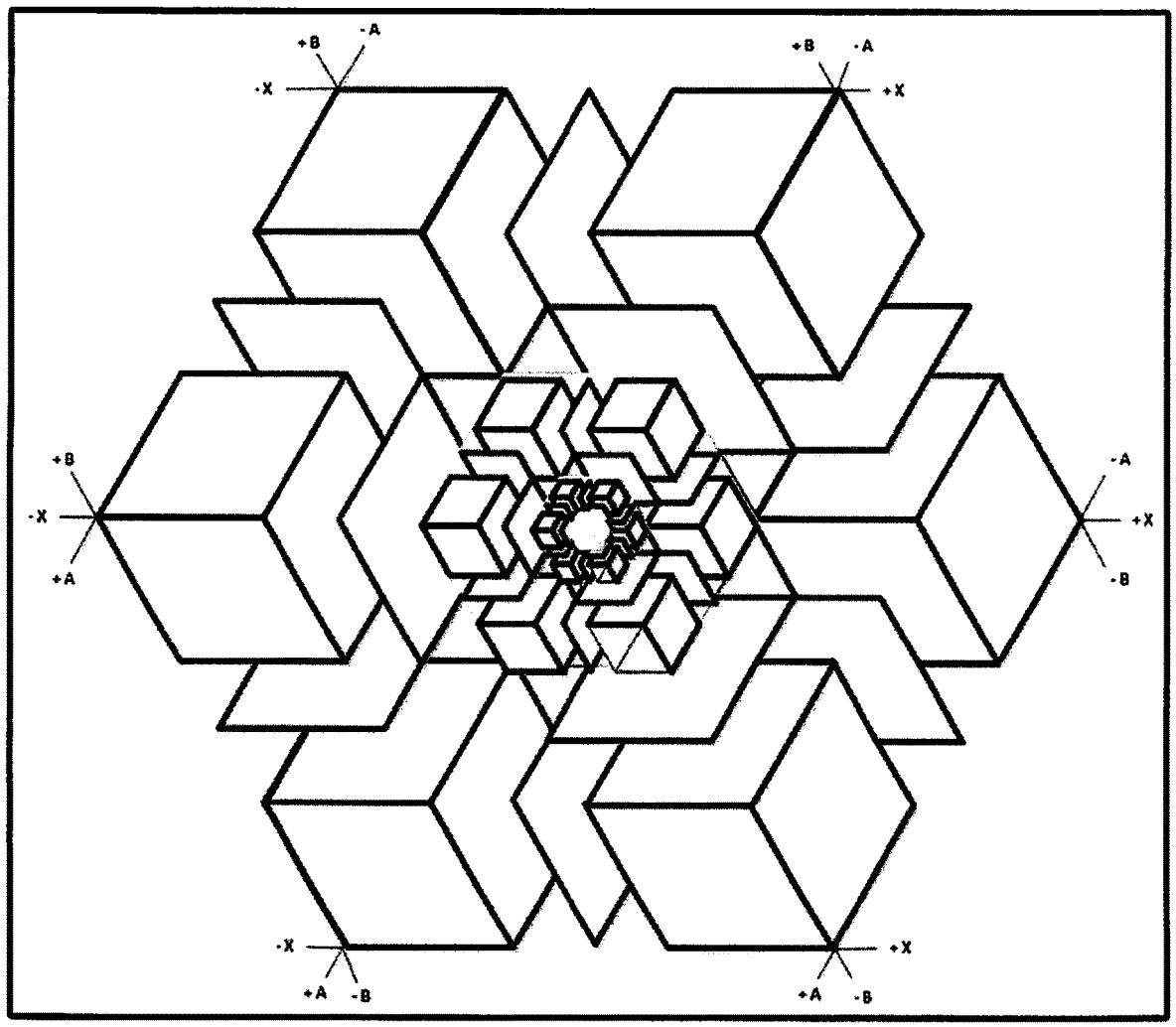
FIG. 3 of the drawings shows a third aspect of an embodiment of the present invention, specifically how data spaces, as shown in FIG. 1, and visualization processes, as described in the body of the disclosure, can exist at multiple different scales or levels of inclusiveness, as well as build on and integrate with each other, such that diverse knowledge on multiple ontological or metrological levels can be brought together and used. For example, general knowledge on one level may be one of multiple sets of particular knowledge able to be integrated on a higher or more inclusive level.

One can see in the Coevaluation Matrix in FIG. 2. That there are not only a wide variety of types of inference supported by the system (all using the same evaluation mechanism described in detail herein, including with formulas provided. (See Formula X Coevaluation builds on AFFIRM, frameworks, functions and interfaces, to provide a logic (for management or coordination) of relationships and development. As with AFFIRM I, coevaluation and other AFFIRM II techniques are capable of representing relationships among (natural, material, physical, often considered 'real') 'entities' as well as among (thought, immaterial, meta-physical, imaginary often considered 'unreal', but here called) 'concepts' (that are considered both real and 'preal', or at least real to the extent they exist in the imagination or the part of an AFFIRM implementation that represents one's imagination). This includes its data structure frameworks, its processes or functions and its interfaces, e.g. views. The coevaluation matrix and other aspects of this AFFIRM II invention describe how the viewing and handling of entities and concepts are achieved in a way that overcomes the schism or dualist separation between concepts (thought) and entities (nature), including both their 'being' and 'becoming', with a new unforeseen level of integration, coherence, explicitness and potential utility. It is hoped that this will usher in new levels of understanding, coordination and cooperation in development. Among others, it is anticipated that those involved in management and science will be positively impacted by AFFIRM, particularly in their efforts researching and developing theory and practice (in various disciplines, professions, etc.). And it is hoped that this will enable people, and their everyday lives, in developed and less developed areas of the world alike, to achieve new levels of development as well.

The new capabilities of AFFIRM II and its artifacts, e.g. as structured and depicted in the coevaluation matrix, as processed through the use of 'visualization', and as guided through the use of both 'coevaluation' and 'visualization', should be useful in research and development (R&D). Again, this is likely to result from how aspects of various related concepts and entities might be coevaluated, and their relationships more effectively codeveloped (with the benefit of a more integrated understanding of how these relationships might evolve.

The depicted coevaluation matrix is one possible embodiment of a global view, which includes different perspectives a given subject might be aware of as an AFFIRM individual subject, elsewhere, e.g. in AFFIRM I, also called a 'home subject'. As mentioned in AFFIRM I and above, a subject may be a concept or entity. In the depicted matrix shows a preferred implementation or embodiment of multiple possible renditions, and is here described as a view, as if it were for one person, e.g. a human or other 'person', e.g. corporation, and therefore, would be for what was described as a Personal Domain (PD) in AFFIRM I. This is a view or perspective that comprises or encompasses eight perspectives from which it is conceivable that all the objects that are known or represented as in some way relating (actually, potentially or becoming, as well as inside, outside or (ex) changing, e.g. out/ingoing, out/including, etc.) to the home subject. A 'domain' or view such as this, may include the 'home subject' as 'self', other subjects that may have been 'guest subjects' that may (also) now have become part of or included in the home subject. These and (at least theoretically all) other (less intimate) objects are (or at least can be) represented within such a domain (and these perspectives) for this 'home subject', and the various different perspectives (eight in this rendition), are used to categorize objects by their respective stages of development (or state) vis-à-vis the subject.

The perspectives framed or represented in the coevaluation matrix (including the four effective and four affective process and perspective types) can be thought of as representing various types of evaluation. There are various types of evaluative processes that are characteristically done from or for each perspective. Many of these are well known, with there being an appropriate place for virtually all types of data from the various types of (mixed) methods of research and evaluation. Also, each perspective involves a characteristic type of data being used for each of the parts that make up a perspective. The character of these types of data should vary appropriately with the state of the object(s) (vis-à-vis the home subject) represented by or embodied in the data. By making sure the data for each part of a given perspective type fits the various states or types of data prescribed for those parts (according to the part's CID), the data feeding to, processing in and resulting from Formula X is able to be regulated appropriately.

As a result of this controlled variation in the different types of data used (as controlled by the CID or classes of data used by each of the parts of each of the types of evaluation), each inference and/or adjustment that may take place is regulated to only allow certain changes at certain phases in the development or evolution of objects, according to their previous or current state or position of objects vis-à-vis the subject. And, as a result, this also helps regulate the possible impact that a given change can have on subjects involved, with each subject maintaining control of what impacts and is impacted by them, such that each is free and responsible for its own development (or self-determination).

As such, these perspectives may be thought of as a range of R&D phases, stages or states of development, through or in which one or more subjects (and/or objects) may be engaged or developed. Each subject is able to use the same types of coevaluation perspectives and processes, each from their unique perspective or position as a unique subject, thus with each subject seeing a unique view. Since each personal domain or view has or presents data from the given home subject's perspective, and the data is uniquely controlled by and for each subject, each home subject's personal domain can be considered a unique and personalized view that is customized by the subject according to their unique needs and aspirations.

According to the preferred embodiment shown here in the coevaluation matrix, a complete (creative or) developmental act, that goes through a full development cycle, can be thought of as involving four steps or stages. This includes (two types of) 'decisions', with each 'decision' made up of two steps, a 'visualization' step and an 'actualization' step (see matrix). In this way, real developmental or creative changes can be enacted or controlled at each step by an involved subject. Each subject has control over the decisions made by them, which include decisions regarding acts or impacts made by them (as 'impactors' through an effective process). This includes effects normally measured by science. The shown coevaluation embodiment also includes decisions by subjects regarding impacts on them (as 'impactees' through an affective process). The (two types of) decisions, making up a complete development cycle, each involve an inference (or visualization) and an actual move (or actualization). One of the (two types of) decisions is about intent or plan (determining a vision of potential), and the other is about implementation or act (determining real action, or actuality).

Domains and entities, preferably with humans controlling and responsible for them, make the 'decisions' from a home domain that is dedicated to and controlled by them, e.g. by using an AFFIRM 'personal domain' to view possible decisions (inferences and/or moves) and enact them when agreed (or at a prearranged time). Formula X transforms information about subjects and objects, including the way the objects might, through context, relate with relevant aspects of the subject, to determine (the amount of) value created or discern (the strength of) values to be used in subsequent decision making, based on their complementarity, relevance or attractiveness. Again, as shown in Formula X, this considers available and relevant data about the subject and their subject's context, including their roles, needs and aspirations. In this way certain decisions, inferences or moves are 'relevated' or raised to a high enough level of priority that subjects are alerted to those with the highest value or priority, such that they can be selected or enacted in a timely fashion. Thus the subject or entity is able to overcome information overload, prioritize activities, and possibly be more likely to achieve success, again, as success is defined by the home subject, in the process of 'coevaluating' values and options with others. In this way one is able to be free to 'self-determine' their future, but able to do it as a conscientious being, within limits that are considerate of their values and those of others potentially impacted. The claims for this aspect of the present invention (as with Formula X and other aspect) are directed to inventive technical solution of technical problems such as the aspects of the invention that make improvements over prior art in enabling computers or computer aided systems to perform more adequately (efficiently or effectively) in (the functions of providing) negotiation, monitoring, evaluations, recommendations, decision-making, including guidance and monitoring of ethical decision-making and change/development processes. For example, the present invention will enable computers to provide (common sense) recommendations in a wider variety of contexts or application scenarios without requiring additional software to be developed for each. It is also able to better explain recommendations than prior art, such as conventional machine learning, so that the human subjects and objects involved in the greater system are better able to understand why the machine is making the recommendations it is. Though claims are directed to technical solutions to technical problems experienced when using prior art, it should also be clear, without diminishing these technical accomplishments, that such technical improvements will also likely provide benefits in a wide variety of non-technical areas, including science and management, as well as everyday political, social or economic affairs.

The Coevaluation Logical Flow and Perspectives

The Coevaluation Matrix, as is shown in FIG. 2, illustrates the different types of evaluation processes and perspectives from which these processes are performed, the interrelationship between these evaluation/perspective types (as organized in the AFFIRM data structure), and the way the results or 'evaluative conclusions from one process trigger development and logically flow to effect and affect other subsequent evaluations and developments, for example in the research and development of practice and theory in a discipline.

In some cases, standard definitions for words used are somewhat modified for better fit with the AFFIRM based coevaluation logic. It is believed that these definitional changes will also facilitate deeper understanding of evaluation and its use in the evaluation and development of theory and practice of evaluation (as well as other disciplines). Though most word modifications should be somewhat self-evident by location of the term within the context of the AFFIRM frameworks and coevaluation matrix (made possible by and realized within the AFFIRM data structure), a bit of introduction is warranted. For example, the use of the word 'synthesis' here in the upper right quadrant of this matrix suggests it is closely related to if not subsumed under 'induction' a label for the character of all the types of evaluation process found in the top row of the matrix. The common character of these two types of induction processes involve objects coming in. Of course, the opposite is true for the two basic types of deduction, one which is standard logical deductive inference, and the other is analytic. The common character of these two types of deduction processes involve objects going out.

As a result, this suggests that there are two basic types of induction (as well as deduction), which this author is disinclined to disagree with. Though it is understood that they are not the same, the point, or reason for agreeing with this interpretation, is that it is useful to put them together (while also keeping them distinct. So, one type of induction, that can be distinctly seen in the co-evaluation matrix, is the relatively standard type which is a sort of qualitative inference from particular (such as entity, value or practice observed, measured or instantiated) to general (such as concept, hypothesis or theory concluded). The other that may be considered a basic type of induction, here called (co-)synthesis, is a sort of quantitative process where unitary objects are 'inducted' into the 'Home Subject', for example, as members of an organization are inducted one individual at a time. The unitary objects of the later type of induction can be 'entities' or 'concepts'. Again, as stated above, in a similar way, there are two basic types of deduction, which are basically the opposite of the two types of induction just described. Together these inductive and deductive process can be thought of as four basic types of change. The 'co-' prefix on them is meant to suggest that, though these are change processes that can be unilaterally enacted by the one Home Subject represented in an AFFIRM Domain, as well as here by the co-evaluation matrix, which could be thought of as being in the mind of one individual. If the individual aspires to being considered as a person, such as people or corporations, it is intended that this organizational structure be used to develop ones theory and practice in a conscious or even conscientious way, to the point of being able to be free and self-regulating while at the same time being ethical and responsible for their impacts on others, thus enabling autonomous subjects to honor and respect their interdependencies to the point where the best interests of all including individuals and the public commons, can be conscientiously achieved.

By more efficiently and effectively (as well as now, affectively) using these basic types of change (and reasoning) to support evaluation and development of theory and practice, persons are, at least potentially, able to perform more interactively and ethically (or collaboratively) with other interacting objects, especially if these also have their own domains in which they are the Home Subject.

In this way, the completeness and accuracy of information being used (and, thus, the conclusions being drawn) in the visualization and actualization processes (processed according to Formula X as specified here) that perform the different types of evaluations and trigger their respective different types of developments (based on conclusions being enacted) can be improved through some form of interactive, if not real-time, involvement of interdependent concepts and entities effecting or affecting (impacting or being impacted by) the process.

One can see from the Coevaluation Matrix (See FIG. 2) representing one Home Subject that the types of evaluation represented there contrast 'effective' (practice) with 'affective' (research), as well as the traditional 'formative' (prospective) and 'summative' (retrospective). Formative evaluative conclusions are results of prospective, ex-ante or forward looking evaluations of visualization processes, and can be referred to as foresight. Whereas summative evaluative conclusions are results of retrospective, ex-post or backward looking evaluations of actualization processes, and can be referred to as hindsight.

Each 'perspective' and its respective type of evaluation is constituted by both a subjective and an objective view or position, with the subjective position, representing the 'world view' or outlook of the subject and the objective view representing the process and exchange objects relevant in a particular context of the subject. The standard visualization process (as represented by Formula X specified here), which, when applied according to the formal co-evaluation logical process depicted on the co-evaluation matrix, can be used for actualization in an analogous way as it is used for visualization. As such, it can be said that Formula X versatilely supports all of the diverse types of evaluation depicted, given proper orientation, which is accomplished by using awareness of the appropriateness of the various distinct evaluation processes and perspectives for different types of contexts, depicted in the co-evaluation matrix, to determine the right perspective that the subject should take at a particular moment. This, and the data available in a particular use case, determine the content displayed or data used by Formula X, which is constantly running in the background, to help the Home Subject formulate a most appropriate response for a given context. For example, the system helps determine if old habits (that might normally be considered 'tried and true') are still appropriate, or if other practices, under development in the earlier stages of the co-evaluation matrix, should be tried. Also see original AFFIRM patent applications for complementary information, such as how there is one level or dimension used to contain each type of data used to prepare for visualization processing and results, etc.

As an example, the Home Subject may use evaluation results from the 'implementing' perspectives, shown in the lower left quadrant of the Coevaluation Matrix (See FIG. 2), to trigger seeking further improvements from R&D in earlier stages of development or refinement, up and to the right. These practices are depicted, given the perspectives, as processes serving others from inside out, and these processes are evaluated accordingly. As can be seen, these evaluations use or are from the perspectives of IV. and D. As can be seen they use known theoretical concepts from science (0-1), combined with particular product and service practices previously 'realized' inside the company to serve customers at a confirmed cost (IV.). These perspectives help analyze service quality, including confirmation of need satisfaction, determining if the subject should be satisfied with the fidelity of its performance, given current theory of practice, of its actual processes used to serve clients from the inside out [Processes (X)–Outgoing (1)].

It helps to understand that the home subject can use this evaluative quality control type information in private first, to improve its ability to meet and surpass standards, prior to needing to share the information with others, for example, to prove compliance with regulatory standards. This proactive approach, doing evaluation internally (at least 'summatively' summing privately), prior to being required to meet public scrutiny or regulatory standards, can help reduce what is called evaluation anxiety. This is, partially at least, made more possible by using the features of a Personal Domain (PD) (as specified in AFFIRM) to enable adequate levels of the necessary interaction with partners or public, e.g. clients, customers, regulators, collaborators, etc.), while maintaining privacy, or at least entirely appropriate levels of propriety. As explained in AFFIRM, an opposite type of relationship can also be maintained where appropriate, anonymous interaction can even take place between PD owners, while reputation for past performance, including quality and value(s), is shared. This is appropriate in situations such as scientific peer review, where knowing the reputations of scientists submitting their work may be relevant, but the particular identity of the scientist may not be. This has the potential to reduce favoritism, while giving credit for hard earned reputations. Notice that including value and/or values in the measurement or reputation enables a far superior scientist, who takes greater risk, to be evaluated based on overall value, rather than merely on a merit or quality rating that may be far from perfect, far from as consistent as other perfectionist scientists, who might be suffering from what this author calls 'Saint Syndrome'.

This propriety afforded by AFFIRM, as well as the deeper knowledge being gained and passed on to the more private research and development (R&D) processes in earlier stages within the Home Subject and/or among collaborating partners can also increase the value and desirability of evaluation. Being proactive about monitoring the quality of performance on the front end of client service, can motivate new research and development (R&D) initiatives, i.e., from IV. forward or backward to I. and D. forward or backward to A., thus leading to entirely new ideas for improvement and ultimately to self-actualization of the subject, given the newfound ability of the subject using these evaluation techniques to develop ideas to fruition.

One of many ways the 'satisfaction of the 'Home Subject' can be determined by comparing the total value of IV. with that of II. (II.-IV.) and D. with B. (B.-D.). This basically goes to see if there are any significant new innovations for the 'context at hand'. If not satisfied, then a comparison is made between III. and C. (C.-III.). This basically goes 'back to the drawing board' to see if C. and III. are aligned and have new highly rated results (evaluated by Formula X) that are 'triggerable' to D. and IV. If not satisfied with current 'designs' and 'prototypes' (in C. and II. Respectively), or just curious about the level of new opportunities that may exist, a comparison may be made between I. and A. (A.-I.). This basically goes 'back to stage one' to see if A. and I. are aligned and 'triggerable' to B. and II. So in both cases the former situations (C.-III.) and (A.-1.) it is checking to see if 'visualization' has sufficient alignment and force to 'trigger a move to 'actualization'. This 'triggerability' is controlled or regulated by whether threshold level(s), based on settings of what is called the 'dial of rationality', or elsewhere called the Rational Research Regulator ('R3'), have been met. These thresholds can consider such parameters as statistical alpha and beta levels and the upside and downside potentials (either, or both, in terms of total or ratio forms) of taking the next step. In both latter cases (D.-IV.) and (B.-II.) the 'dial' or 'regulator' would know if there is a new and better opportunity that is worth trying in (for) the next trans/inter/action or exchange.

On the coevaluation matrix, under each box labeled with the particular evaluation type, the given perspective of the type of is detailed. There are two complete CIDs, each of the types 1-1, 0-1, 1-0 and 0-0, with one listed above the other on top of the arrow running under the box. The top CID represents the subject and bottom CID represents the objects. Together they comprise the definition of the unique one of possible perspectives available for the particular type of evaluation. The arrow running under the box leads to the location where visualization results are stored or summarized for the given type of evaluation. A particular instance of the given type of evaluation is defined with this information, along with the data for the Home Subject with private access to the given perspective and the objects that are appropriately evaluated from this given perspective by this evaluation type associated with the given perspective for the subject. These subjects and objects are represented in and/or are referenced from the home domain of the subject for which the evaluation is being done. The data records for each subject and object are accessed according to the two CIDs making up the perspective. These CID, which are used as 'entity kinds' in a preferred implementation, are used in conjunction with the LinkID property of the records (used as 'entity IDs' in a preferred implementation) found at the 'kind' location, which are then used as entity IDs, along with using the CID for 'entity kind' to know the 'key' to where data is stored and must be gotten for visualization. This information, which can be reused and or augmented on various levels or dimensions of the data store, can be used to traverse the data store to get the data records needed to be used by a particular instance of the type of evaluation method being run by visualization (and actualization) (or Formula X). There are also what are called 'position views' that can help define the various perspectives and data that are appropriate for a given instance or set of instances of Formula X, as well as its use, view, dial settings, and other factors influencing the handling of processing and of results.

The CIDs of the subjective and objective positions determine the 'perspective' for a given type of evaluation being run by visualization. The one side, left or right, of the subject and object CIDs which has opposite signs are used by a visualization method (using Formula X) to determine which data to get in a particular instance, e.g., for perspective and evaluation type IV. In the lower left quadrant, the subject view CID is 0-1 and the object view CID is 1-1. In this preferred implementation, for the particular instance being described, the 0-1 CID (or 'kind') would be used in place of a + and the 1-1 is used in the place of a − in the Formula X. There may be different ways other than this used to identify and access data for a given instance of visualization. Regardless, the appropriate data is located and provided to process Formula X.

The AFFIRM (coevaluation and visualization) logic is able to (process data in a computer or processor to) (efficiently use data stored in a memory, organized according to an AFFIRM-like data structure, to) cause (or trigger) real change in (terms of at least one of effecting or affecting at least one of) the state or value of objects vis-à-vis (or in relation to) a given (potentially dynamically changing) subject (so as to at least one of the many results mentioned on the coevaluation matrix including: implement, organize, synthesize, analyze, induct, conceptualize, deduct, particularize, etc. real objects for a subject).

This may be done from the standpoint of the then given subject's one or more perspectives, each of which support a type of evaluation on the coevaluation matrix. The results may be cohesively integrated into at least one, more or less comprehensive, interfaces organized to effect or affect subsequent change in other related areas of the subject and its collaborators. This interface can be used to transact, authorize, or merely observe the real tangible (and intangible) changes being made by the AFFIRM-based system on behalf of the Home Subject. These changes may include logical inferences using general and particular terms, conclusions of which can be set to trigger such real changes, as a result of reasoning and decisions made by the system or users. These changes may also include inter-subject ex-changes of objects, at which time the actual change is caused or triggered, the subject can incrementally or manually control, or be represented by proxy by automated processes of a given subject's AFFIRM based domain (of which it is the Home Subject).

User Interface Mechanism

Figure 5:
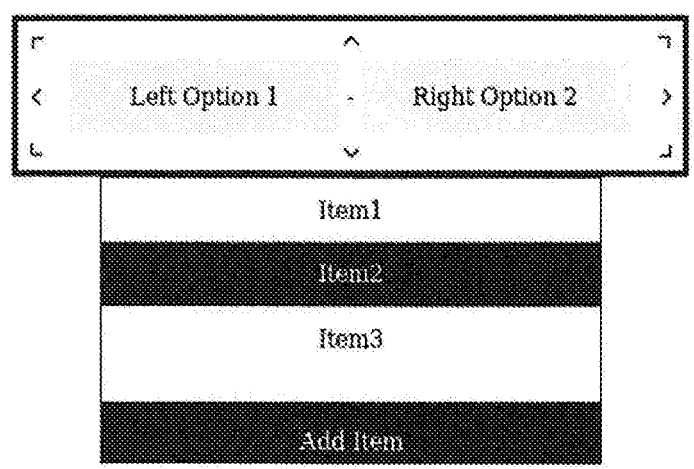
FIG. 5 of the drawings shows fifth aspect of an embodiment of the present invention, specifically a screenshot of an embodiment of a GUI component called the super button in a closed or semi-closed state.
Figure 6:
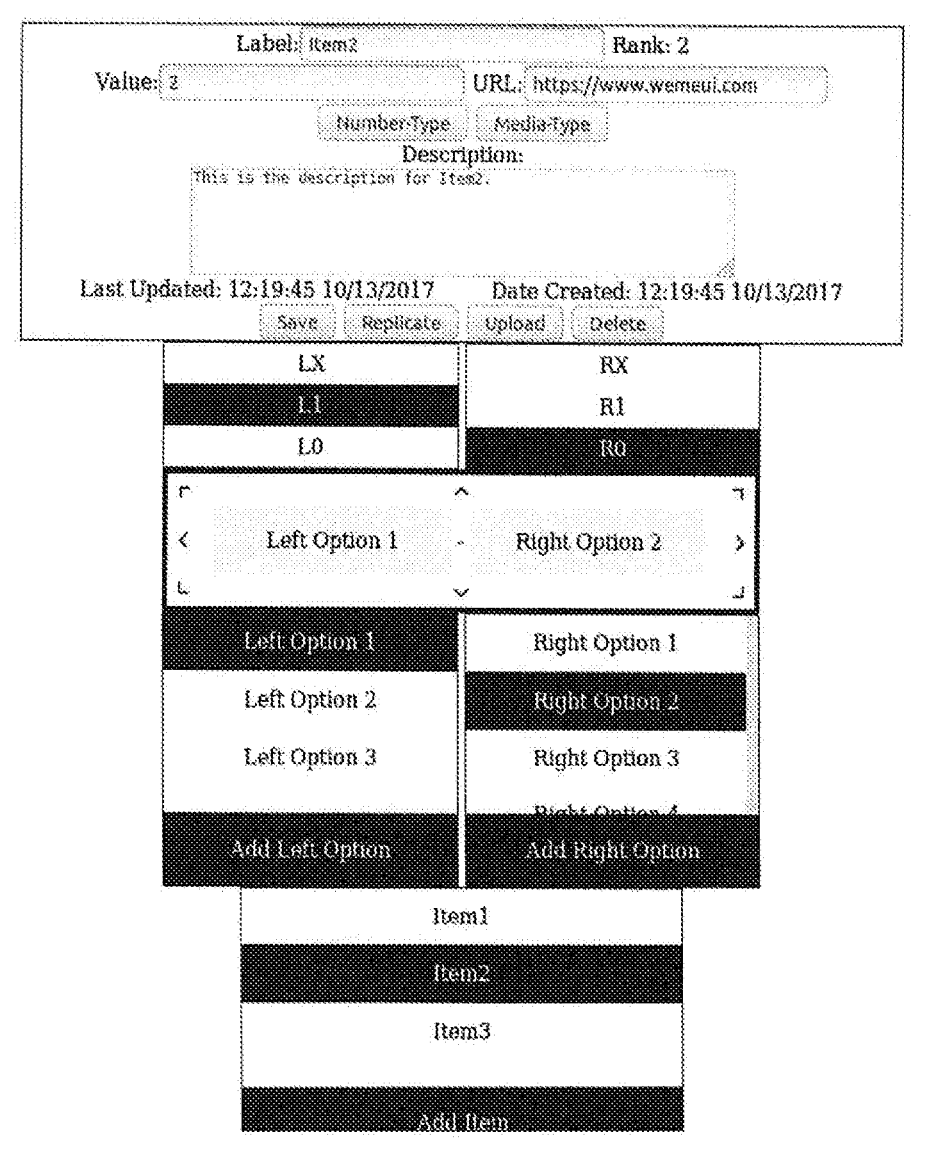
Figure 7:
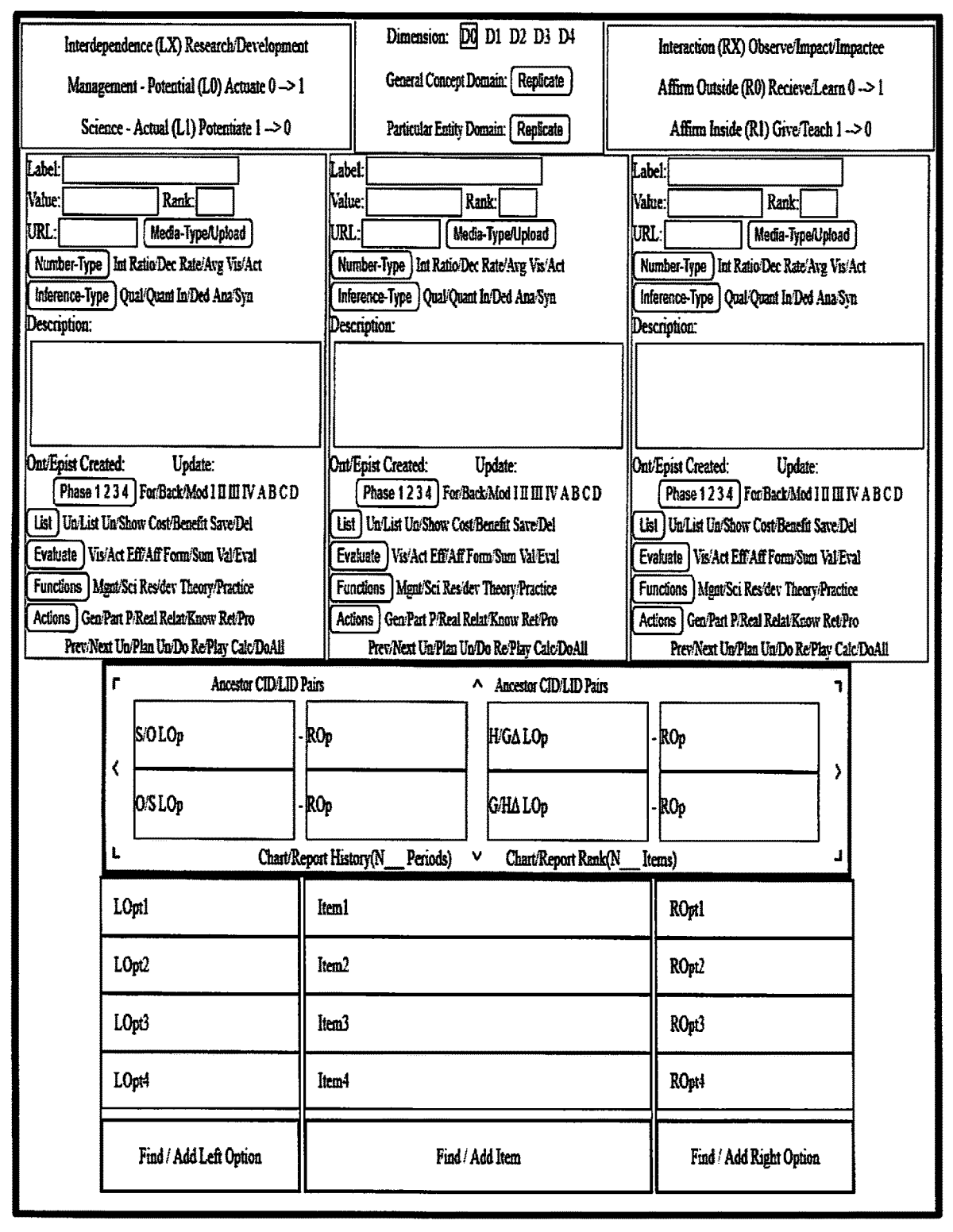
Figure 8:
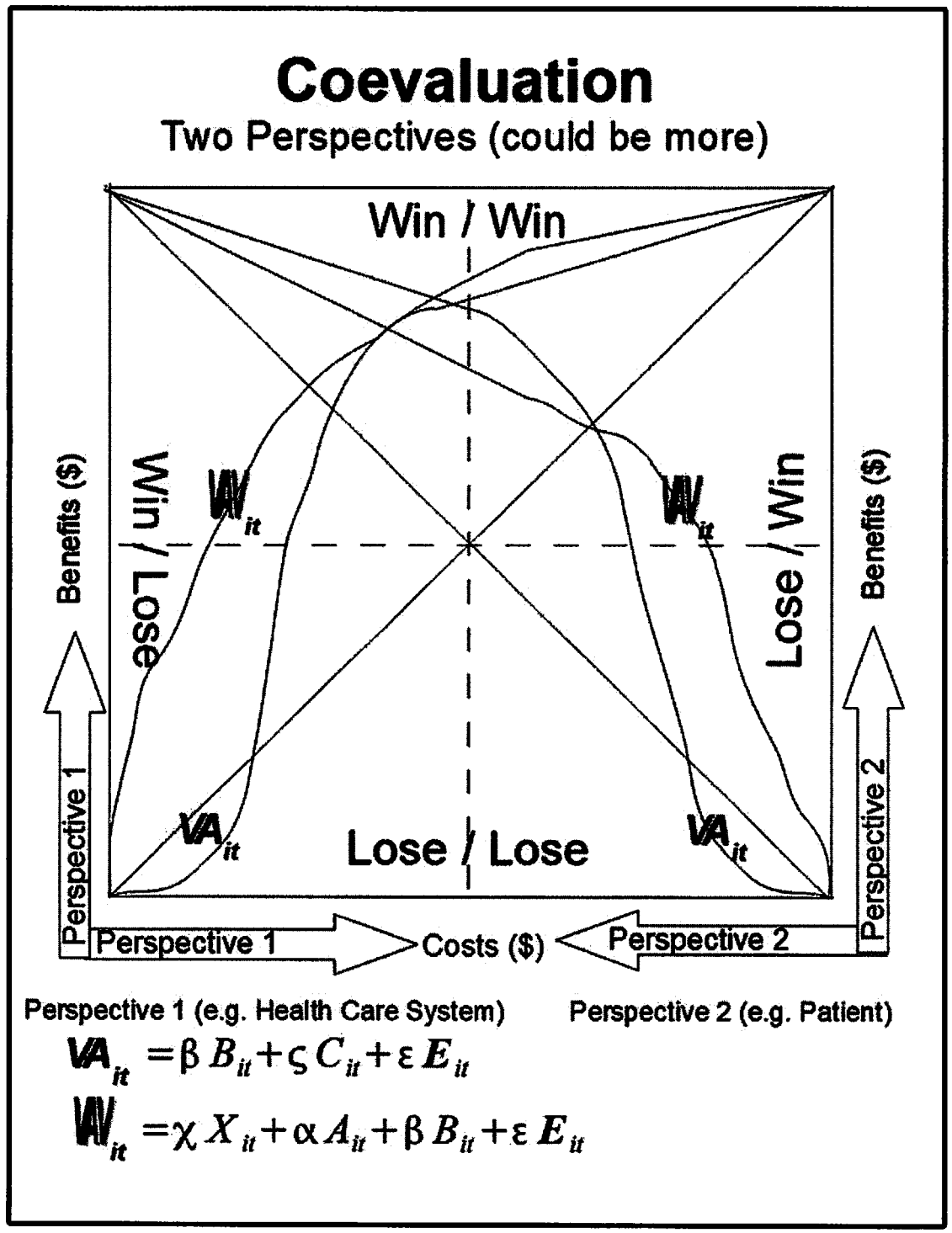
FIG. 8 of the drawings shows an eighth aspect of an embodiment of the present invention, specifically a new type of user interface or chart capable of communicating the equity of a coeval relationship, from the origin of a relationship, such that one can readily understand if the relationship is a balanced one that is mutually beneficial for the multiple parties involved.

The Super Button shown in FIGS. 5, 6 and 7 are used by a superuser to setup the Position Views (PV) that, once populated with data, provide other users with real-time analytic and transactional support. Users are also supported with unique decision support tools, such as FIG. 8, which shows a kind of Coevaluation Chart that provides a snapshot of value creation and equity, including the extent to which a relationship is 'Win/Win'.

Decision-Making and Implementation Monitoring

The logic, in both FIGS. 2 and 9, provides rules that regulate the finite state machine that implements the coordination mechanism. Combining this with the evaluation formula enables the system to not only provides real-time guidance to domains and subjects, but also helps manage governance providing appropriate authority to actually negotiate and transact binding agreements and other arrangements. The guidance engine is based in an evaluative visualization (prediction) & actualization mechanism patterned after Formula X, a versatile (or general AI) algorithm which involves multiple technical solutions to technical problems that are disclosed here for the first time. The monitoring and control mechanism specified conceptually shows how to coordinate collaborative innovation in such a way that it learns from and enhances everyday activity (in real-time). The system also combines the Formula X predictions, optionally, with Bayesian machine learning, which also continuously updates 'priors' based on this monitoring mechanism so as to attempt to minimize prediction errors of the predictive evaluation. Since the present invention enables human like inference by machines and structures data in a conceptually logical way, the system seems to act reasonably. The system also is able to provide explanations to back up its actions or recommendations in human understandable language. Thus these features provide valuable function for humans, but most directly, the system instructs itself. Though the system directly learns, users and other subjects of the system also benefit, which includes the machines, domains and people that work together to create value.

The system logic enables continuous adaptation to dynamically changing contexts in complex environments, by constantly monitoring change (see table in FIG. 9 that says how each change is tracked). Also see the AFFIRM data structure from patent '862. This enables the consideration of interdependencies and the coordinated interactions between a home subject and any number of other (guest subjects) who interact through bidirectional links, one of the techniques the present invention uses to make this possible.

Each home subject has a similar looking, but totally personalized user interface divided in a similar way to the Coevaluation Matrix in FIG. 2. There are 8 types of inference supported by Coevaluation, also shown in FIG. 2. Each type of inference is supported by a different type of evaluation, even though they are all able to be processed by the same evaluation mechanism (which uses the same Formula X to provide predictions of what activities will provide the greatest return. A given evaluation and inference type uses a different specific set of four class identifiers (CID) that are not only meaningfully and yet symmetrically patterned to support perspective switching on the fly, but also enables the system to infer the object part of the position view from the subjective key or vice versa. The Link Identifier (LID), as an entity, concept or object identifier, works together with the CIDs (from patent '862) to define the data and location key, for not only the subjective oriented data but also the objective-oriented data. Also see the Formula X description and the step-through instructions along with it. Once results are provided and decisions are made, the CID of the predicate can also be inferred. Note that each PV is comprised of a combination of CID/LID pairs for each of 2 parts (left and right) for each dimension. See more details on these data structures here and the way these are changed or flipped in a systematic or patterned way in FIG. 9, to see the capabilities of this.

Track and Control Interdependency and Interaction for Technically Superior Impact Evaluation System First of all, keep in mind that the Coevaluation Matrix shows one home domain or subject's perspective, with all eight position views oriented to the home's perspective. This goes along with the way the AFFIRM data structure saves all events with the state of objects relative to the orientation of a home subject.

A given home domain or subject is empowered to autonomously self-determine its development. It is in control, given the way the present invention works. Decisions and actions that impact a home domain or subject are under its control. In other words, it is the executor of its home domain or subject. This empowers the home domain or subject and encourage individual responsibility for one's own behavior and development. The home subject is the only one who can act in their domain. One can see that decision-makers or 'Actors' transform the object of visualization and actualization into a predicate, which is the action of affecting a subject. One can see that this is actually the case here. No matter who the decision maker is, the $2^{nd}$ CID is transformed to the predicate or 3rd CID in the home domain, as well as the $4^{th}$ CID in a guest domain. This guest domain data can then be used by the other's Home domain that is associated with the given guest domain. This data resides outside of this other's home domain, with no control of the home (see FIG. 2).

Guest Subjects do have authority to trigger affective change (influence) in others. This enables a Home Subject to see advice or opinions from all sorts of sources. So for one, it's not just the other's opinions seen, but an unlimited number (N) of others. This results from the ability to update an unlimited number of others with a domain's or subject's opinions, if one want to, and if those others are partnered or guest subjects. If there is transparent sharing implemented partners are then updated when decisions are made to share the particular kind of information. There is granular control over which others see what information, based on some not being linked into certain facets, even though these others may be privy to some.

The guest subject provides feedback (kind of like marketing research) so the home subject can behave conscientiously and, if working properly, as ideally conceived, in a way that is most likely to benefit all concerned as much as potential allows. Also, although one can't generalize about individuals, as if only one type of us are teachers and the others are students, since we can all teach. But still in the role of a teacher—student relationship, the expectation is, at least traditionally, that the teacher teach and the student learn. Still, the hope is that the coevaluation logic for relationships and development will encourage all people to broaden their horizons and play all the diverse roles they can, thus encouraging self-actualization and development for all.

| Impactor (effector) | Impactee (affector) |
|---|---|
| (Teacher/Supplier/ Provider/Servicer) | (Student/Customer/ Patient/Client) |

Guest Subject is Decision-Maker (Actor in Effective and Reactor in Affective-Loops):

| Phase 2- In Position View II. | And in Position View B. |
|---|---|
| Phase 3- In Position View III. | And in Position View C. |

Home Subject is Decision-Maker (Actor in Effective and Reactor in Affective-Loops):

| Phase 1- In Position View I. | And in Position View A. |
|---|---|
| Phase 4- In Position View IV. | And in Position View D. |

Figure 4:
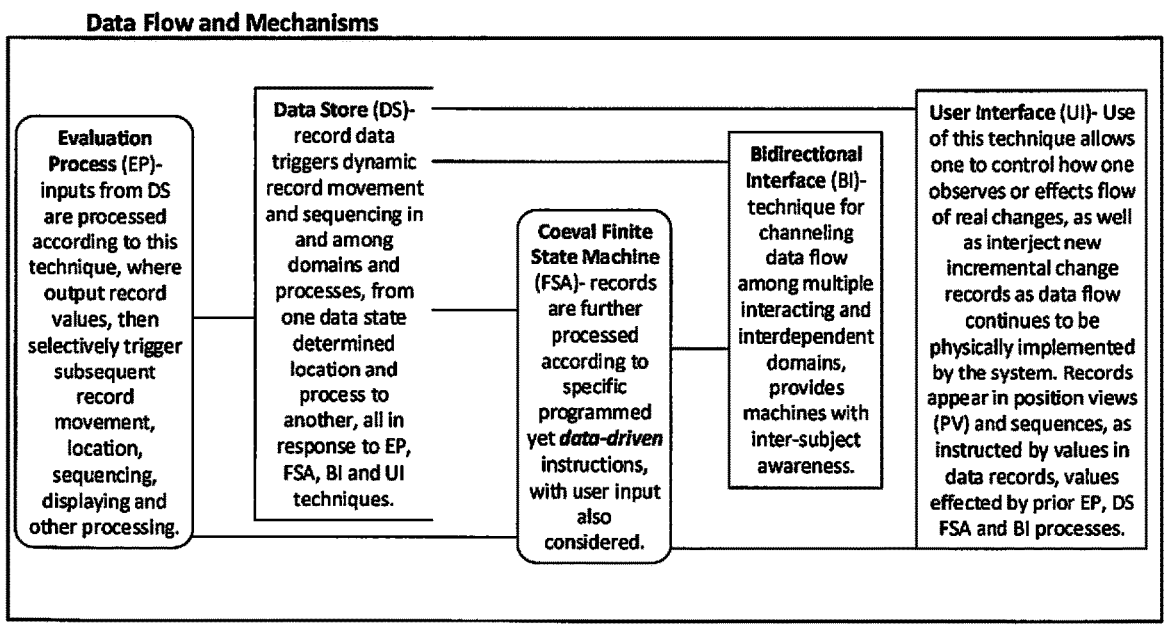
FIG. 4 of the drawings shows a fourth aspect of an embodiment of the present invention, specifically how the multiple features and mechanisms of the system may interact to support or enhance functionality of the system, both independently and together in interdependent ways.

See the Coevaluation Matrix in FIG. 2 and the Programming Rules table (in FIG. 4, if not moved back to body text, or dropped all together), for change updates, basically the flipping of CIDs and LIDs on each side of each dimension as decisions are being made in a Position View. These changes are also documented in each position view in the Coevaluation Matrix as can be seen in FIG. 2. Basically these update changes are from the state of the object decided upon in 2nd CID to (4) the $3^{rd}$ CID in the Actor domain. This would be in the Home Domain (HD) in Phase 1 and Phase 4, with the $4^{th}$ CID shown on FIG. 2 being where the change record is sent to in the Guest Domain (GD). For example, in Phase 1, Position View I., 'HD$_1$', as the designated process owner, is IDed as the LID paired with the X 'right side' parent record (as in where you see 'Actual 1–Exchange X process owners are HD$_1$(HD$_{0,Xs}$)' and the 1-0 CID is the event record flipping, the change is made in the 'HD$_1$' domain in CID 0-0, listed in the $3^{rd}$ place after the '→' (see FIG. 2), and in the GD$_{O,Xs}$ in 0-1 CID, shown in the 4th One can see from the Coevaluation Matrix in FIG. 2 and the Programmable Updates Matrix in FIG. 4, that a home domain or subject can merely observe others, with the option of affirming potentiating or actuating events, with only the affirmation of an actuation actually counting as effective change, since if one affirms another's potential, it is still up to the other to 'potentiate' that potential in the home state. Only then will the home domain or subject be able to then take the next step to actually follow through on the potential and 'actuate' such. Specifically, one might affirm another's potential with a particular suggestion in Position View D, which will then stage for the other the background information for why one is suggesting this (it can go 4 dimensions or more deep if you really want), but then it is up to the other to actually follow through and trigger the actuation (which will be updated in Position View A. in one's HD and C. in the other's GD. Again, this shows that two domains and/or subjects can take turns acting in a coordinated fashion, i.e. seeing other's actions just in time to consider them as the other is doing same. Also with complete automatic updating of the current view, the next time one is in that particular evaluation/inference/decision-making mode again it will be current. This is a powerful technique for keeping all domains and/or subjects involved in a negotiation current. When the change one makes is potentially or actually highly impactful, then an alert will be issued to any significant others to inform them of the possibility.

HD Affective Decisions (giving feedback) are in Phase 1 (A.) and Phase 4. (D.)

HD Effective Decisions (feeding forward) are in Phase 4 (IV.) and Phase 1. (I.) (See FIG. 9)

Bidirectional interaction $1^{st}$ provides feedback on previous actions and reactions. Then self-determining executive decisions that drive real change for an HD are able to be executed in an informed way. Evaluation (visualization & actualization) provide formative and summative feedback and guide negotiation of Win/Win agreements and equitable action. If a decision-maker, whether for a domain or subject, is in home state, then it is both an impactor and an impactee. It is important that such domains and subjects consider the effects and affects of re(actions) and to consider if being equitable. One tool the present invention provides to give a quick snapshot of this equity is the Coevaluation Chart, See FIG. 8. Home Subjects drive the Effective Change Loop in Phase 1 in Position View (PV) I. and in Phase 4 in PV IV., and drive the Affective Change Loop in Phase 3 in PV A. and Phase 4. PV D.

APPENDIX

Data Structures, Domains and Dimensions

Although the implementation can be done in many ways, the preferred implementation uses just character strings for the actual data. It is possible that one could use bits for the actual CID portion of the data records that actually represent incremental change.

Some of the important pieces of the data record structure, for the discussion of the present invention are the following (for more see '862):

Class ID (CID—symmetrically patterned state class identifier that provides state management capabilities, such as switching data perspective from subject to object at will. It is also possible, based on the information provided in the coeval matrix and the table on interdependence and interaction types below.

Link ID (LID)
Create-date
Number type
Value

The LID is basically an object ID to use to link from one 'home domain' where raw data resides for an individual domain or subject to another domain, where the home subject is considered a guest. The bidirectional link or interface mechanism is reflected in FIG. 2.

This data structure is described "symmetrical state management pattern

It is what we have called a Class Identifier (CID)

The data structure has also been described as: 'uniform and generally applicable', 'subject and object oriented' and a 'meta-model', with many of these qualities contributed by this CID. There are several Combinations.

Class Identifier (CID)

LEFT RIGHT

X|0|1–X|0|1

The symmetry of this state class template is useful for many reasons:

No transformation needed to feed Formula X, which can use either a 0 or a 1 as a + in the formula and then the rest can be determine by the program, e.g. if subject is 1 object is 0. It also enables the symmetry of the reciprocal bi-directional links that exist in all sorts of locations possible.

Given the preferred implementation of the Uniform Basic Data Unit (UBDU), there is one Link ID per CID, i.e. one of each in each record. This has been used in several different system architectures with great effect. One preferred implementation is to have the CID-LID pair structure looks like this (one pair for each of two sides L for left and R for right):

X|0|1–L LID–X|0|1–RLID

As can be seen from the way it's used in the Coeval matrix and other tables, this is a very powerful technique. This same structure can be used for each of an unlimited number of dimensions, though a practical level of about 5 dimensions is usually sufficient. We usually can do all that is necessary on no more than 6 dimensions.

So for one implementation the lookup key is comprised of the following information for each dimension:

So for the five dimensions it would look like this:

| | |
|---|---|
| 0D | X \| 0 \| 1 - L LID - X \| 0 \| 1 - R LID |
| 1D | X \| 0 \| 1 - L LID - X \| 0 \| 1 - R LID |
| 2D | X \| 0 \| 1 - L LID - X \| 0 \| 1 - R LID |
| 3D | X \| 0 \| 1 - L LID - X \| 0 \| 1 - R LID |
| 4D | X \| 0 \| 1 - L LID - X \| 0 \| 1 - R LID |

There are single and double LIDs and CIDs digits:

| | |
|---|---|
| X | |
| 0D | LID - X \| 0 \| 1 |
| 1D | LID - X \| 0 \| 1 |
| 2D | LID - X \| 0 \| 1 |
| 3D | LID - X \| 0 \| 1 |
| 4D | LID - X \| 0 \| 1 |

And

| | |
|---|---|
| X-X | |
| 0D | LID - X \| 0 \| 1 - LID - X \| 0 \| 1 |
| 1D | LID - X \| 0 \| 1 - LID - X \| 0 \| 1 |
| 2D | LID - X \| 0 \| 1 - LID - X \| 0 \| 1 |
| 3D | LID - X \| 0 \| 1 - LID - X \| 0 \| 1 |
| 4D | LID - X \| 0 \| 1 - LID - X \| 0 \| 1 |

| X | |
|---|---|
| 0D | LID - X \| 0 \| 1 |

In the single X class we have 0 general or 1 particular states

| X-X | |
|---|---|
| 0D | LID - X \| 0 \| 1 - LID - X \| 0 \| 1 |

In the dual or double X class we have 1 subject and 0 object states, though as a result of this data structure one can make either 0 or 1 subject and know the other is object (or vice versa). The technical advantage of this is that one domain or subject can empathize with another or compare itself to another object, rather than, always looking at (or evaluating) a particular situation from one's one subjective perspective, usually referred to as a default position view (PV) (the system can, as an option, leave this choice up to a user or other subject). As a subject evaluating objects, for example, a scenario can be established where, if one is a consumer (or producer) evaluating producer (consumer), [it is as if one is a conducer (or prosumer) evaluating prosumer (conducer)] (or the reverse, depending on how the data is arranged, which is controlled by selecting particular PVs or evaluation modes (See FIG. 2). Technically, the symmetry of the 'state class pattern' or CID enables shifting between juxtaposed states for analysis. This gives the approach flexibility in data analysis, while also enabling transactions to be managed with the needed fault tolerance.

Basically by taking one state value from each of the two sides, one is able to derive the possible combinations of the CID, 0-0 through 1-1. Actual change is able to be incrementally tracked in real-time in 'item' records that are in one of the four possible states (per dimension). Four Event Types—each incremental change record has one of these four possible combinations for the two digits of the CID per dimension 0-0, 0-1, 1-0 and 1-1. These represent the possible types of complete change, and are used to appropriately identify the state for each of the different perspective that may be involved in an exchange 'event'. (See the Coeval Matrix from FIG. 2. for more information)

The events or incremental change records flow through header locations in the database that look like the following. As can be seen in the Coevaluation Matrix in FIG. 2, each set of two position views is associated with one of the particular below, where the system can infer that when an LID that matches the X digit, this identifies a process owner, the home subject X that is in control of making decisions on what passes through the given header. An X header includes the 1 and 0 data: 1–X, X–0, 0–X and X–1.

The symmetry (and uniformity) of the state class template is technically useful for many reasons. Some more include, no need to reprogram software when a new piece of information is needed in the database table, no transformation needed to feed Formula X, which can use either a 0 or a 1 as a + in the formula and then the rest can be determine by the program, e.g. if subject is 1 object is 0. So, for the above example, if 1-0 were visualizing 1-1, which is what is being done for decision mode C. in upper left quadrant of the Coevaluation Matrix, FIG. 2. Then data that matches the key up to the point where the right side is in the given dimension is 0 can be used for + in formula X and then that data with 0 can be used. Also, there are similar benefits for reciprocal bidirectional links. In fact the bidirectional links are traversed in order to access the data for Formula X. The way such a symmetrical state class pattern can allow the system to immediately know the appropriate class to use when evaluating objects is a plus.

What is claimed is:

1. A versatile method of assessing object(s) for (or based on the unique needs, aspirations or purposes of) distinctly considered subject(s), a given instance of said method comprising the steps of:
    persistently storing or representing current state of said subject(s) and object(s) as at least one of being potential, actual or in process of becoming potential or actual, or being outside, inside or in process of becoming inside or outside vis-a-vis a given 'home subject';
    identifying said subject(s) as being either concept(s) or entity(s) in select stage of development or state vis-a-vis said 'home subject';
    identifying said object(s) as being either concept(s) or entity(s) in select stage of development or state vis-a-vis said 'home subject';
    identifying and accessing data about said subject(s) and object(s) in said states vis-a-vis a given 'home subject';
    processing data about said subject(s), including relevant context data related to said subject(s) and object(s), according to a procedure, such as that outlined in Formula X, to transform data about said object(s) to assess their at least one of value, relevance, significance, merit, worth, attractiveness, force, appropriateness, readiness, fit or complementarity for said subject(s), for the purpose of impacting at least one of awareness, understanding, changes, reasoning, decisions, control, interaction or development of (or among) said subject(s) and object(s), particularly by or in relation to 'home subject';
    persistently storing or representing any changes that result in the state of (or among) said subject(s) and object(s), particularly by, in relation to or vis-a-vis 'home subject'; and
    optionally utilizing formula X, namely:

FORMULA X $$^rM_{x^-\cdots}^{\cdots} = \frac{1}{A^-}\sum_{a^-=1}^{A^-}\frac{1}{B^-}\sum_{b^-=1}^{B^-} r_{x^-a^-b^-}\left\{\frac{1}{X^+}\sum_{x^+=1}^{X^+}\left[\frac{1}{A^+}\sum_{a^+=1}^{A^+}\left(r_{x^+a^+b^-} * \left(\frac{1}{B^+}\sum_{b^+=1}^{B^+} r_{x^+a^+b^+}\right)\right]\right]\right\}$$

$$\left\{\frac{1}{X^+}\sum_{x^+=1}^{X^+}\left[\frac{1}{B^+}\sum_{b^+=1}^{B^+}\left(r_{x^+a^-b^+} * \left(\frac{1}{A^+}\sum_{a^+=1}^{A^+} r_{x^+a^+b^+}\right)\right]\right]\right\}\left\{\frac{1}{A^+}\right.$$

$$\sum_{a^+=1}^{A^+}\left[\frac{1}{B^+}\sum_{b^+=1}^{B^+}\left(r_{x^-a^+b^+} * \left(\frac{1}{X^+}\sum_{x^+=1}^{X^+} r_{x^+a^+b^+}\right)\right]\right]\right\}.$$

\* \* \* \* \*